(12) United States Patent
Thomas et al.

(10) Patent No.: US 11,654,813 B2
(45) Date of Patent: May 23, 2023

(54) RECONFIGURABLE CUP HOLDER ASSEMBLY

(71) Applicant: Ford Global Technologies, LLC, Dearborn, MI (US)

(72) Inventors: Gregory Paul Thomas, Canton, MI (US); Shiran Chen, Farmington Hills, MI (US); Stephen Neal Jacobsen, Plymouth, MI (US); Michele Marie Mathews, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 160 days.

(21) Appl. No.: 17/246,230

(22) Filed: Apr. 30, 2021

(65) Prior Publication Data

US 2022/0348126 A1    Nov. 3, 2022

(51) Int. Cl.
    *B60N 3/10* (2006.01)
(52) U.S. Cl.
    CPC .................... *B60N 3/102* (2013.01)
(58) Field of Classification Search
    CPC ........... B60N 3/10; B60N 3/102; B60N 3/108
    USPC .................................................. 297/188.21
    See application file for complete search history.

(56) References Cited

U.S. PATENT DOCUMENTS

| | | | |
|---|---|---|---|
| 5,072,989 A * | 12/1991 | Spykerman | A47C 7/62 297/188.19 |
| 5,746,363 A * | 5/1998 | Teller | B60N 3/103 224/547 |
| 6,547,326 B1 | 4/2003 | Walkinshaw et al. | |
| 7,147,259 B2 | 12/2006 | Radu et al. | |
| 2006/0261644 A1 * | 11/2006 | Cutshall | B60N 3/002 297/173 |
| 2014/0084116 A1 * | 3/2014 | Brunard | F16M 13/02 248/122.1 |
| 2016/0362031 A1 | 12/2016 | Dunham et al. | |

* cited by examiner

*Primary Examiner* — Mark R Wendell
(74) *Attorney, Agent, or Firm* — Vichit Chea; Price Heneveld LLP

(57) ABSTRACT

A reconfigurable cup holder assembly for a vehicle comprises: (i) a base structure, and (ii) a cup holder portion pivotably coupled to the base structure about a pivot axis, the cup holder portion comprising a first cup holder and a second cup holder, each of the first cup holder and the second cup holder defining a space configured to hold a container for liquid, and the cup holder portion is pivotable about the pivot axis to, from, and between a first position relative to the base structure and a second position relative to the base structure; wherein, the pivot axis extends through the space of the first cup holder. The second cup holder can pivot greater than or equal to 75 degrees about the pivot axis when the cup holder portion moves from the first position to the second position.

20 Claims, 25 Drawing Sheets

RECONFIGURABLE CUP HOLDER ASSEMBLY

BACKGROUND

A user of a vehicle sometimes desires to consume a beverage while being within the vehicle. The vehicle sometimes includes a holder sized and shaped to hold a container for the beverage. Some vehicles have integrated cup holders into a center console of the vehicle. Some passengers may desire the ability to reconfigure the placement of the cup holders.

SUMMARY

The present disclosure addresses that desire with a reconfigurable cup holder assembly that includes a first cup holder and a second cup holder attached to the first cup holder, the second cup holder being pivotable about a pivot axis that extends through the first cup holder throughout a range of at least 75 degrees. The second cup holder being pivotable about the pivot axis that extends through the first cup holder allows the passenger of the vehicle to change the orientation of the second cup holder relative to the first cup holder, such as from a side-by-side configuration where the second cup holder is laterally to the side of the first cup holder to a fore/aft configuration where the second cup holder is oriented forward or rearward of the first cup holder.

According to a first aspect of the present disclosure, a reconfigurable cup holder assembly for a vehicle comprises: (i) a base structure, and (ii) a cup holder portion pivotably coupled to the base structure about a pivot axis, the cup holder portion comprising a first cup holder and a second cup holder, each of the first cup holder and the second cup holder defining a space configured to hold a container for liquid, and the cup holder portion is pivotable about the pivot axis to, from, and between a first position relative to the base structure and a second position relative to the base structure; wherein, the pivot axis extends through the space of the first cup holder.

Embodiments of the first aspect of the present disclosure can include any one or a combination of the following features:

the second cup holder pivots greater than or equal to 75 degrees about the pivot axis when the cup holder portion moves from the first position to the second position;

the base structure comprises a pivot bracket disposed at least partially under the first cup holder of the cup holder portion, the pivot bracket comprising a receiver through which the pivot axis extends, the receiver bounded by a radial surface having a radius from the pivot axis and a height parallel with the pivot axis;

the reconfigurable cup holder assembly further comprises a support bar comprising (i) a bracket attachment section comprising a cylindrical portion that is disposed and rotatable within the receiver of the pivot bracket, the pivot axis extending through the cylindrical portion, and (ii) a bar section extending outward from the bracket attachment section and the pivot axis, the bar section terminating under the second cup holder;

the bracket attachment section of the support bar further comprises snap-fit elements, and the snap-fit elements cooperate with slots into or through the radial surface of the receiver of the pivot bracket to resist withdrawal of the bracket attachment section of the support bar from the receiver of the pivot bracket;

the cup holder portion further comprises a housing that at least partially houses a side wall and a bottom surface of the first cup holder and a side wall and a bottom surface of the second cup holder, the housing comprising a bottom wall extending under the bottom surface of the first cup holder and the bottom surface of the second cup holder, the bottom wall of the housing is attached to the support bar;

the housing of the cup holder portion is attached to the support bar under the first cup holder and under the second cup holder;

the bar section of the support bar is disposed between the bottom surface of the second cup holder and the bottom wall of the housing of the cup holder portion;

the base structure comprises a storage bin at least partially surrounding the cup holder portion, the storage bin comprising (i) a bottom wall that is disposed under both the first cup holder and the second cup holder when the cup holder portion is in the first position and when the cup holder is in the second position, and (ii) a side wall that extends upwardly from the bottom wall, the side wall comprising portions that face each other and between which the cup holder portion is disposed;

the storage bin further comprises an aperture through the bottom wall through which the pivot axis extends;

the base structure further comprises a pivot bracket disposed at least partially under the first cup holder of the cup holder portion and the bottom wall of the storage bin, the pivot bracket comprising a receiver through which the pivot axis extends;

the reconfigurable cup holder assembly further comprises a support bar comprising (i) a bracket attachment section comprising a cylindrical portion that is disposed through the aperture through the bottom wall of the storage bin and into the receiver of the pivot bracket, the cylindrical portion of the bracket attachment section being rotatable within the receiver of the pivot bracket, and the pivot axis extending through the cylindrical portion of the bracket attachment section, and (ii) a bar section extending outward from the bracket attachment section and from the pivot axis, the bar section terminating under the second cup holder and above the bottom wall of the storage bin;

the bottom wall of the storage bin comprises a flat portion and a valley portion;

when the cup holder portion is in the first position, the first cup holder is disposed over the flat portion and the second cup holder is disposed over the valley portion;

when the cup holder portion is in the second position, the first cup holder is disposed over the flat portion and the second cup holder is disposed over the flat portion thus allowing greater access to the valley portion from an environment external to the reconfigurable cup holder assembly than when the cup holder portion is in the first position; and the reconfigurable cup holder assembly is disposed at a center console of a vehicle.

According to a second aspect of the present disclosure, a vehicle comprises: a reconfigurable cup holder assembly comprising: (i) a base structure, and (ii) a cup holder portion pivotably coupled to the base structure about a pivot axis, the cup holder portion comprising a first cup holder and a second cup holder, each of the first cup holder and the second cup holder defining a space configured to hold a container for liquid, and the cup holder portion is pivotable about the pivot axis to, from, and between a first position relative to the base structure and a second position relative to the base structure; wherein, the pivot axis extends through the space that the first cup holder defines.

Embodiments of the second aspect of the present disclosure can include any one or a combination of the following features:
- the base structure comprises a pivot bracket disposed at least partially under the first cup holder of the cup holder portion, the pivot bracket comprising an aperture through which the pivot axis extends;
- the reconfigurable cup holder assembly further comprises a support bar comprising (i) a bracket attachment section comprising a cylindrical portion that is disposed and rotatable within the receiver of the pivot bracket, the pivot axis extending through the cylindrical portion, and (ii) a bar section extending outward from the bracket attachment section and the pivot axis, the bar section terminating under the second cup holder;
- the vehicle further comprises a row of seating comprising a first seating assembly and a second seating assembly;
- the reconfigurable cup holder assembly is disposed inboard relative to the first seating assembly and inboard relative to the second seating assembly;
- the vehicle further comprises a row of seating comprising a common seat portion that is configured to support more than one passenger of the vehicle;
- the reconfigurable cup holder assembly further comprises (i) a stowed position where the cup holder portion is inaccessible from the row of seating, and (ii) a usable position where the reconfigurable cup holder assembly is disposed over the common seat portion and the cup holder portion is accessible from the row of seating;
- the pivot axis about which the cup holder portion of the reconfigurable cup holder assembly pivots is either vertical or varies from vertical by an angle of less than or equal to 10 degrees;
- the vehicle is configured to move in a forward direction;
- a plane extending vertically through both the first cup holder and the second cup holder is disposed more orthogonally to the forward direction while in the first position than while in the second position; and
- the plane extending vertically through both the first cup holder and the second cup holder moves throughout a range greater than or equal to 75 degrees while the cup holder portion moves from the first position to the second position.

According to a third aspect of the present disclosure, a vehicle comprises: a cup holder portion comprising a first cup holder and a second cup holder, the cup holder portion pivotable about a pivot axis that extends through the first cup holder, the second cup holder pivotable about the pivot axis throughout an angle of greater than or equal to 75 degrees, wherein the pivot axis is either vertical or varies from vertical by an angle of less than or equal to 10 degrees.

These and other aspects, objects, and features of the present disclosure will be understood and appreciated by those skilled in the art upon studying the following specification, claims, and appended drawings.

DETAILED DESCRIPTION

Figure 1:
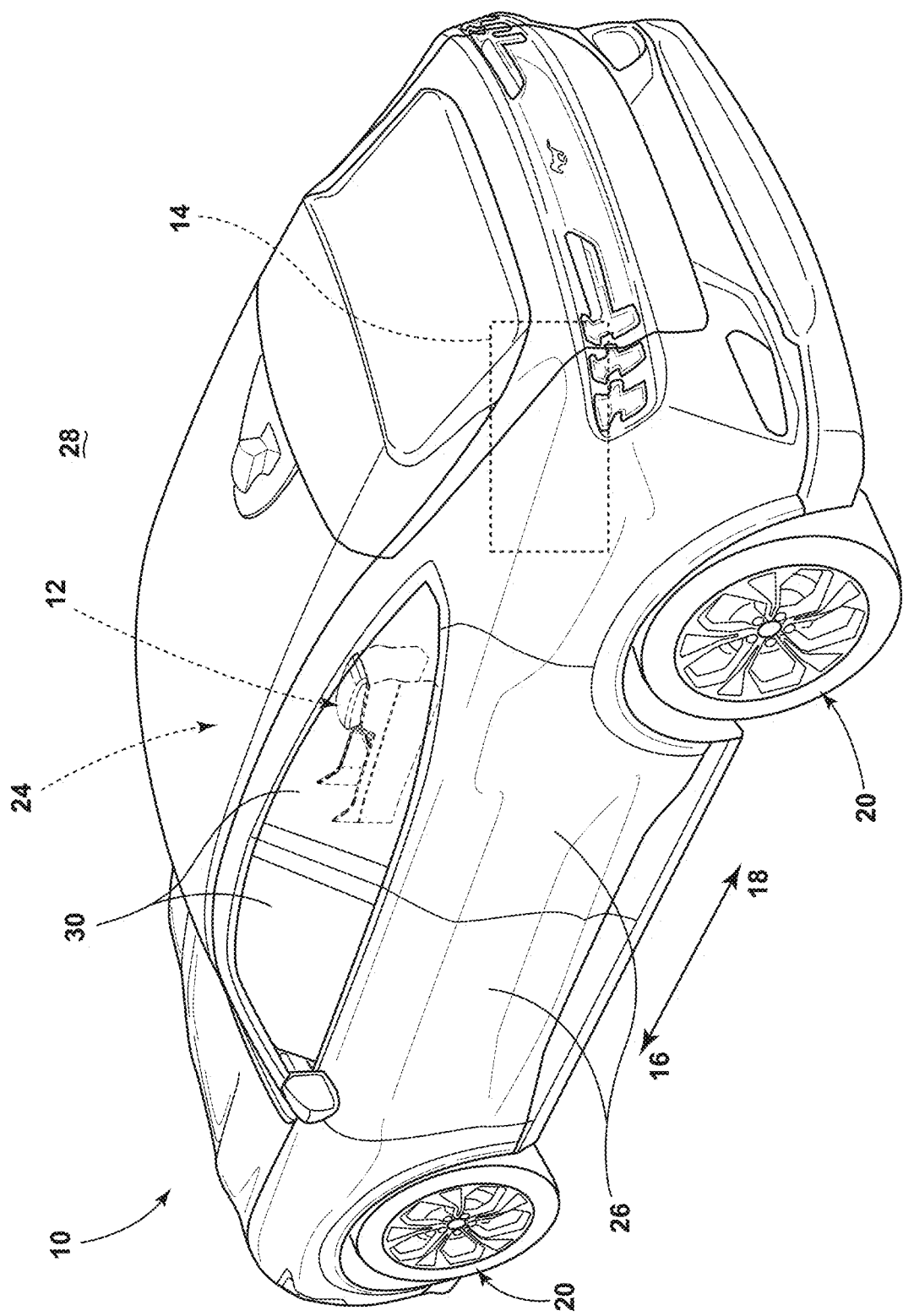
FIG. 1 is a rear perspective view of a vehicle with a cut-away view into an interior of the vehicle, illustrating a reconfigurable cup holder assembly disposed within the interior.

Referring to FIG. 1, a vehicle 10 includes a reconfigurable cup holder assembly 12. The vehicle 10 further includes a source 14 of propulsion that moves the vehicle 10, such as in a forward direction 16 or in a rearward direction 18. In embodiments, the source 14 of propulsion is an electric motor, an internal combustion engine, or both an electric motor and an internal combustion engine. In embodiments, the vehicle 10 further includes one or more wheel assemblies 20, and the source 14 of propulsion causes the wheel assemblies 20 to rotate thus propelling the vehicle 10. The vehicle 10 can be a car, a truck, a sports utility vehicle, a van, a semi, a passenger train car, an airplane, among other options. The vehicle 10 can be operated by a passenger 22, semi-autonomous, or fully autonomous. In embodiments, the vehicle 10 is utilized to provide ride-hailing or ride-sharing services. In embodiments, the vehicle 10 is utilized to provide public transport.

The vehicle 10 further includes an interior 24 and one or more doors 26 separating the interior 24 from an environment 28 external to the vehicle 10. In embodiments, the vehicle 10 further includes one or more windows 30 also separating the interior 24 from the environment 28 external to the vehicle 10. In embodiments, the reconfigurable cup holder assembly 12 is disposed within the interior 24.

Figure 2A:
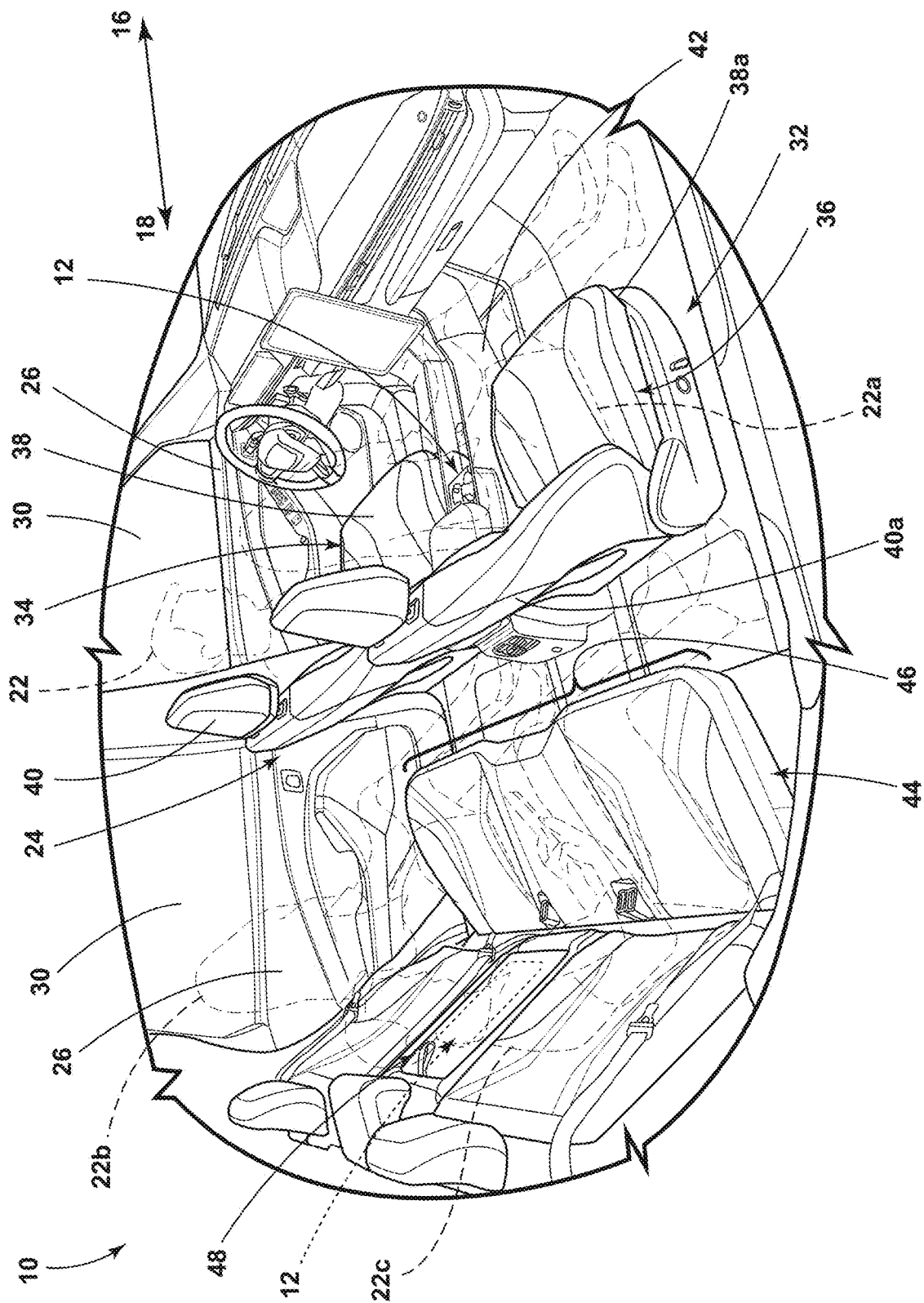
FIG. 2A is a perspective view of the interior of the vehicle of FIG. 1, illustrating the reconfigurable cup holder assembly disposed at a center console between a first seating assembly and a second seating assembly of a first row of seating, and another (identical) reconfigurable cup holder assembly in a stowed position at a second row of seating.
Figure 2B:
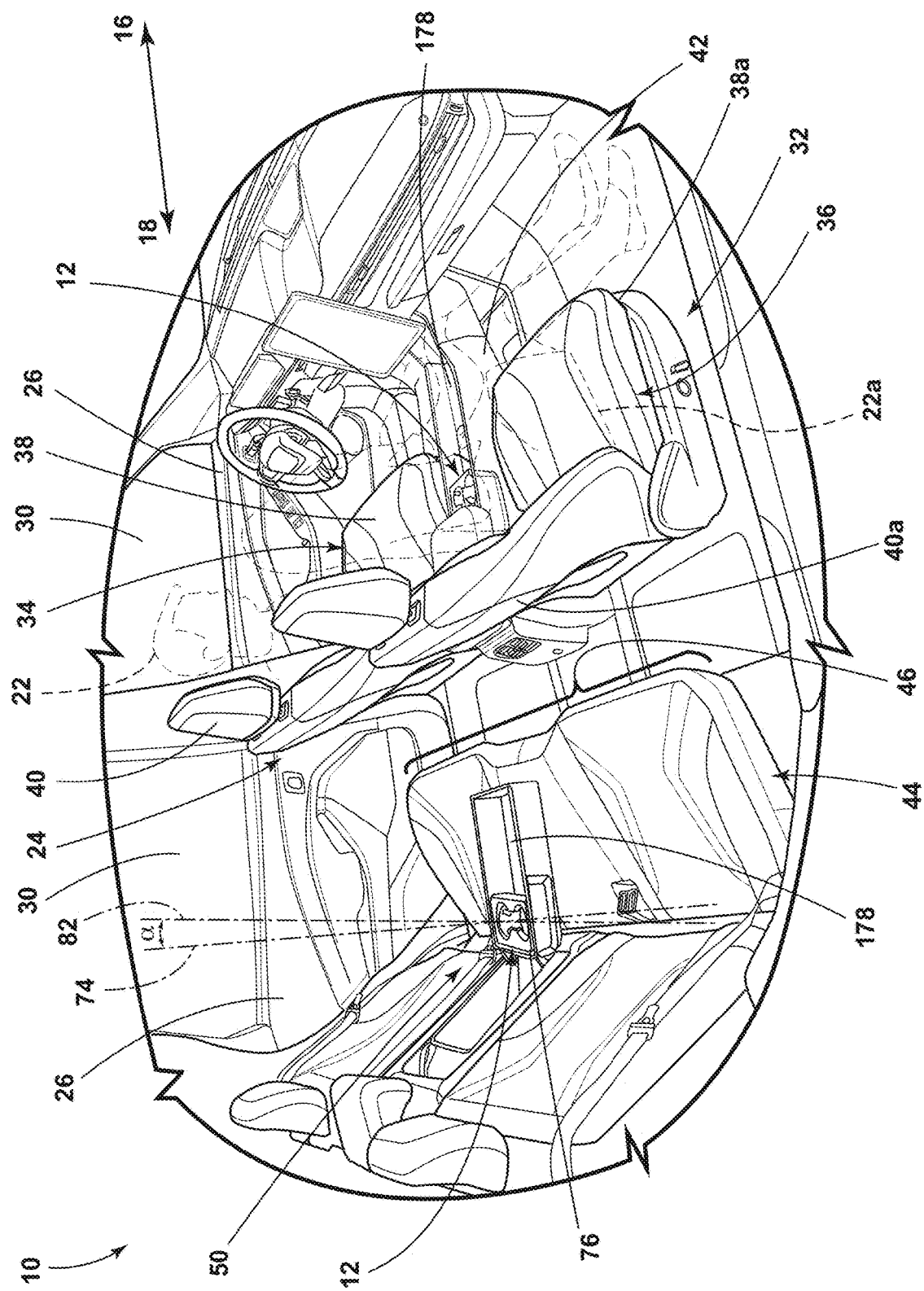
FIG. 2B is the same view of FIG. 2A, but now illustrating the reconfigurable cup holder assembly of the second row of seating in a usable position over a common seat portion of the second row of seating.
Figure 3A:
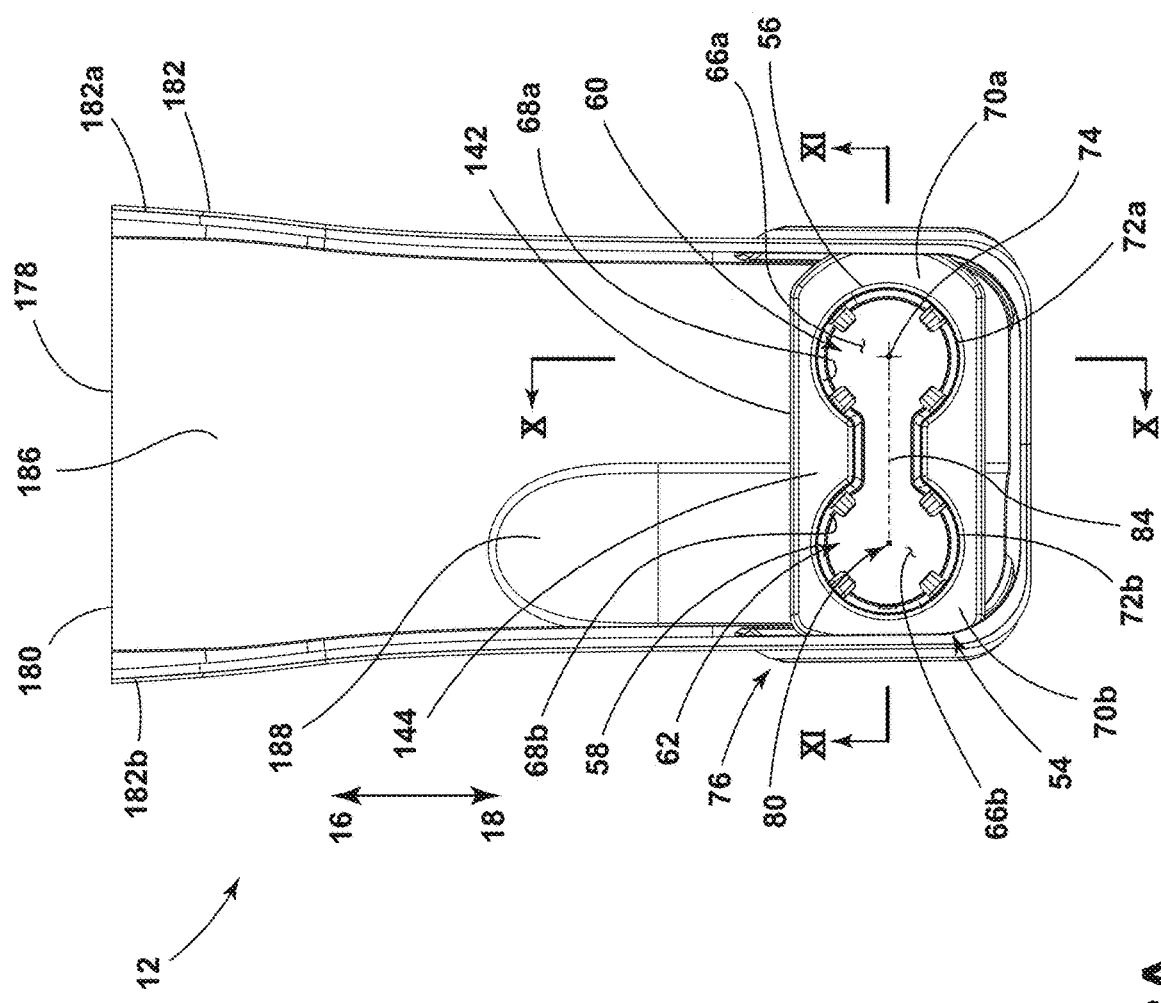
FIG. 3A is an overhead view of the reconfigurable cup holder assembly of FIG. 1, illustrating a cup holder portion in a first position where a first cup holder is laterally oriented relative to a second cup holder.
Figure 3B:
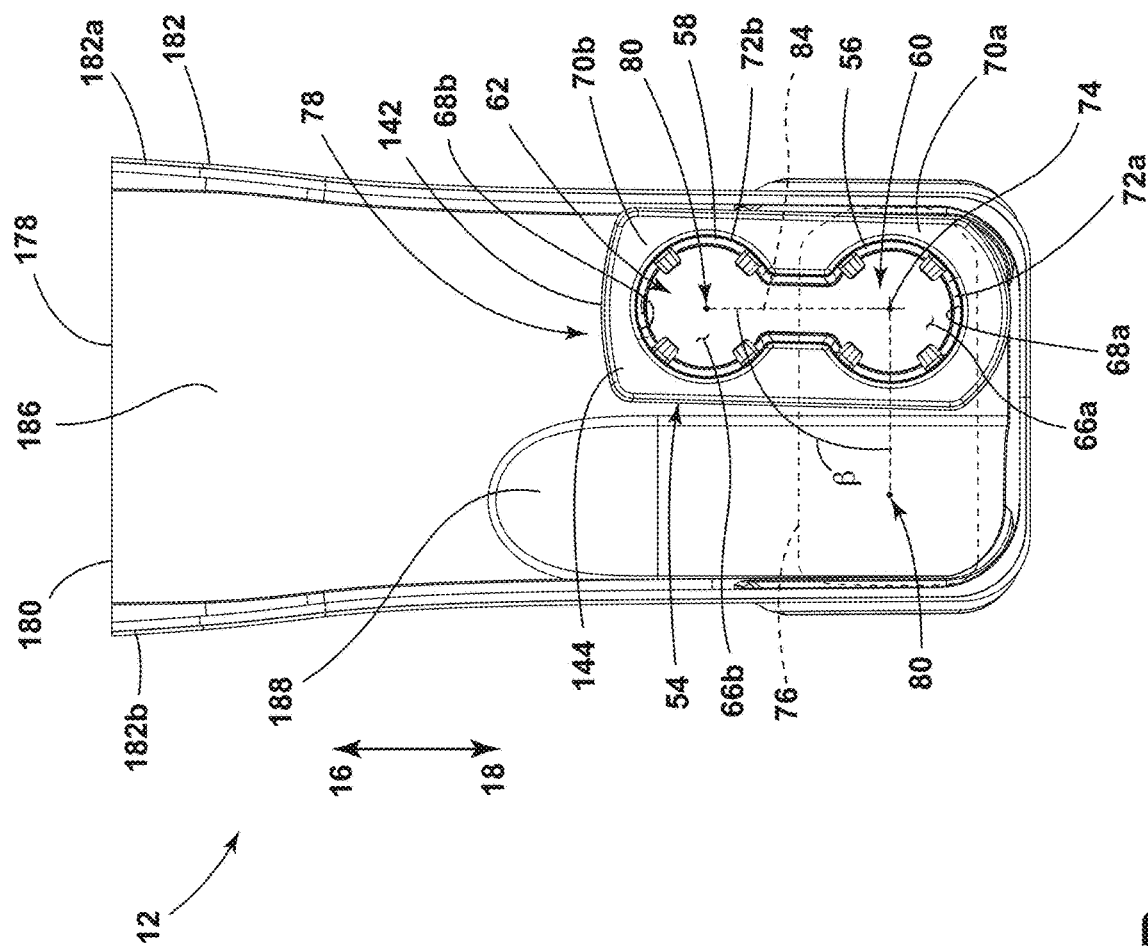
FIG. 3B is the same overhead view of FIG. 3A, but now illustrating the cup holder portion having pivoted about a pivot axis extending through the first cup holder approximately 90 degrees to a second position where that the second cup holder is forward for the first cup holder, and movement of the cup holder portion about the pivot axis reveals a valley portion of a bottom wall of a storage bin partially surrounding the cup holder portion.
Figure 4:
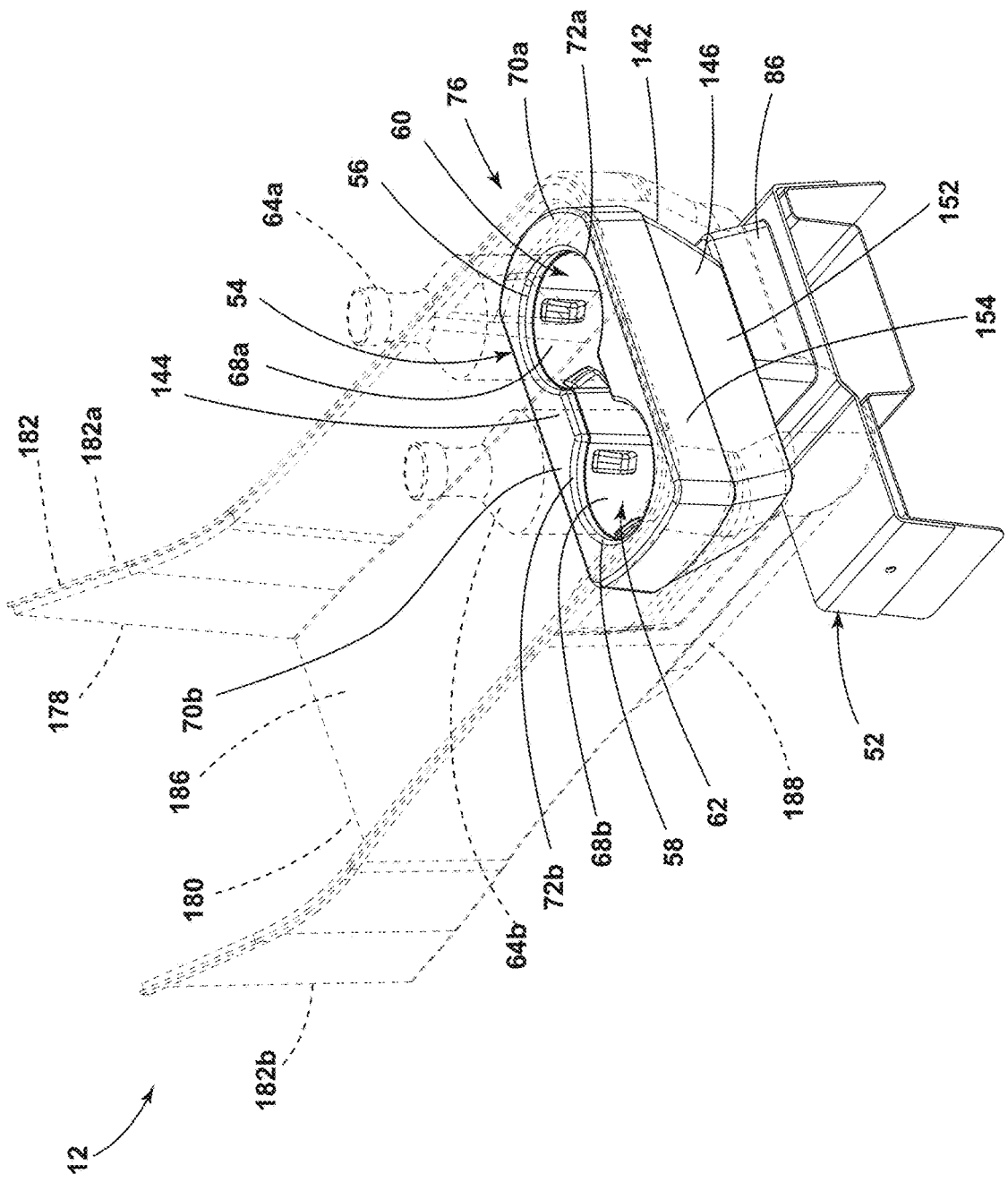
FIG. 4 is a perspective view of the reconfigurable cup holder assembly of FIG. 1 with the storage bin in phantom, illustrating the first cup holder and the second cup holder holding containers for liquid (in phantom), and a base structure disposed below the cup holder portion to which the cup holder portion is pivotably attached.
Figure 5:
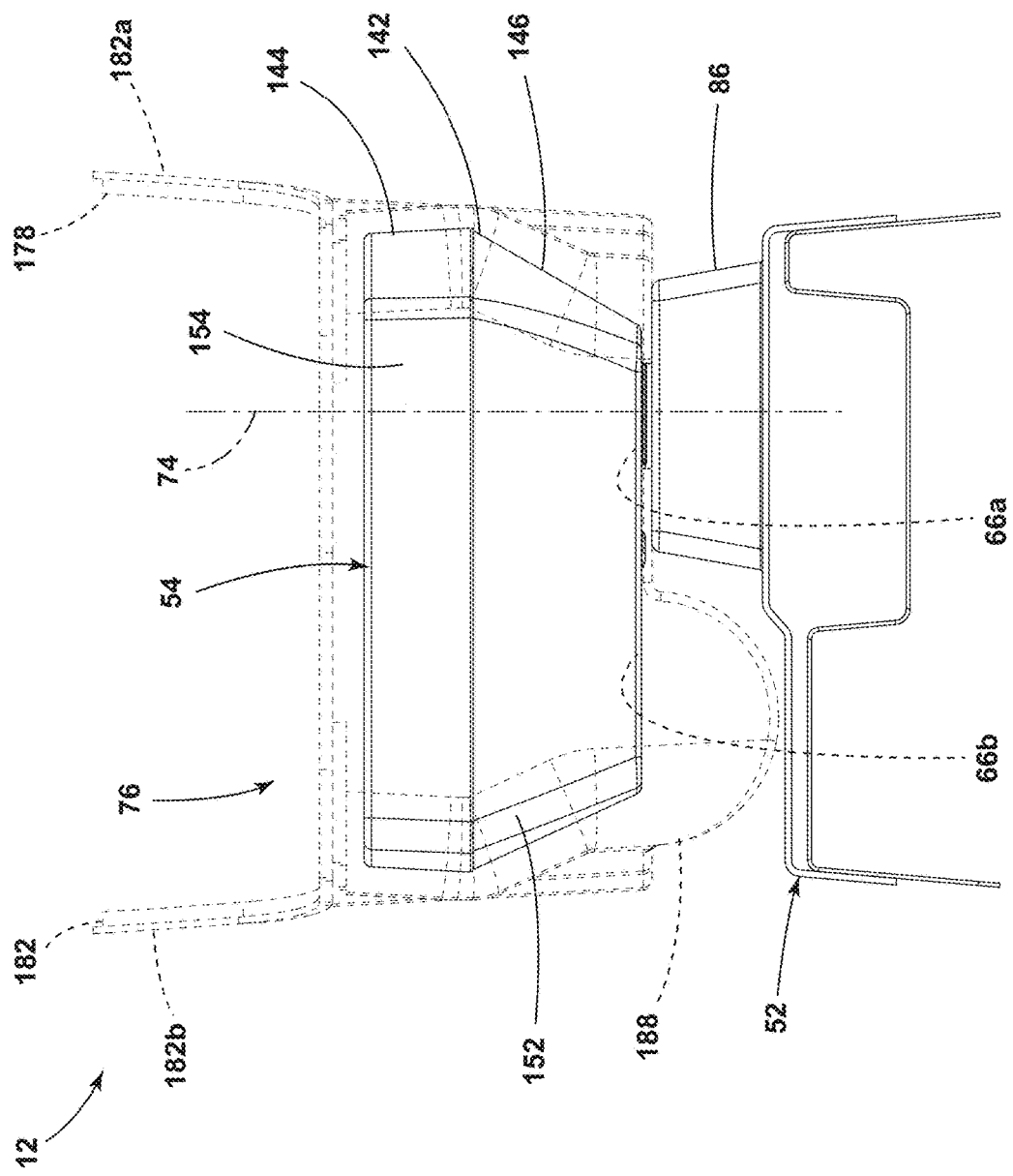
FIG. 5 is a rear view of the reconfigurable cup holder assembly of FIG. 1 with the storage bin in phantom, illustrating the base structure having a pivot bracket through which the pivot axis extends.
Figure 6:
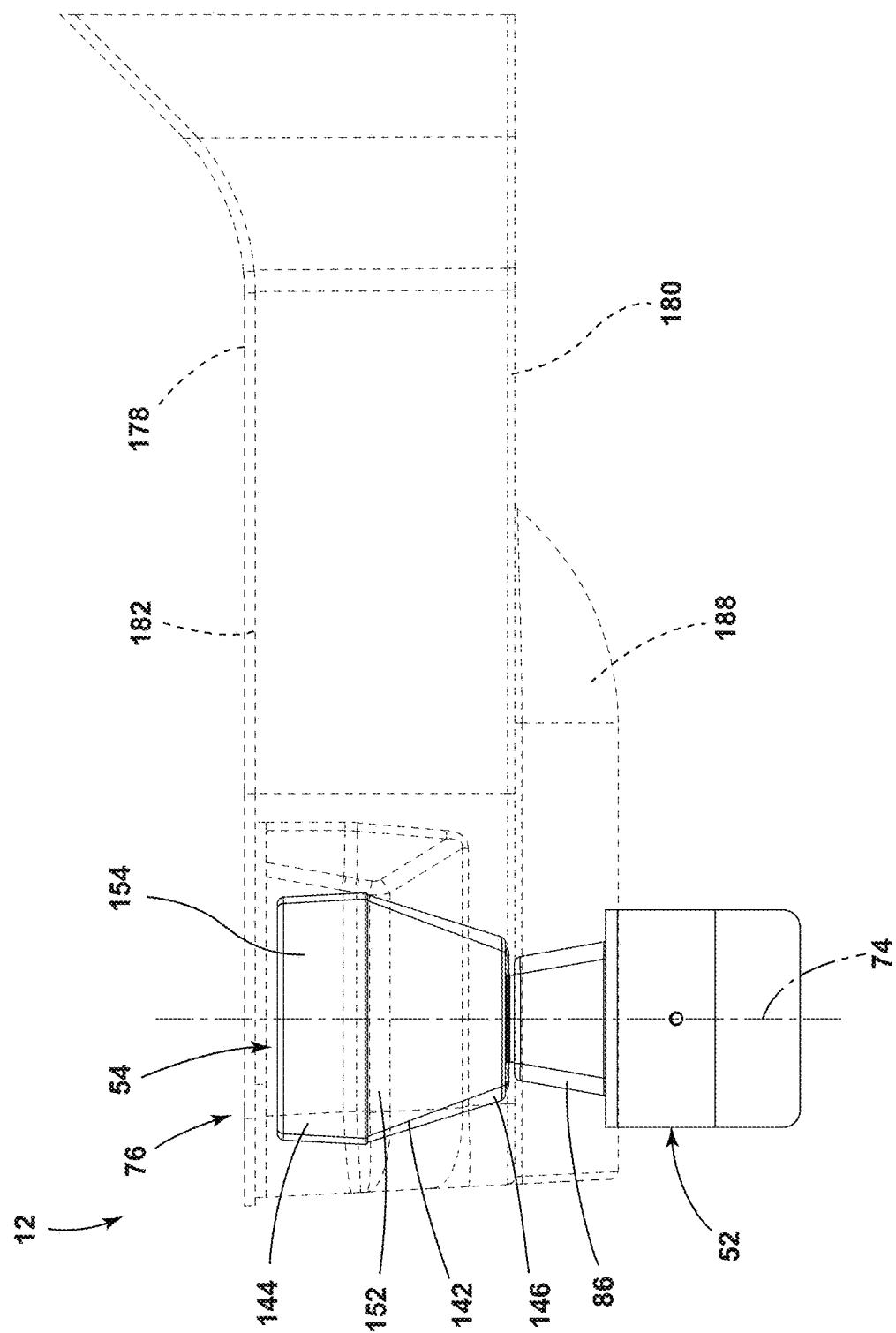
FIG. 6 is a side view of the reconfigurable cup holder assembly of FIG. 1 with the storage bin in phantom.
Figure 7:
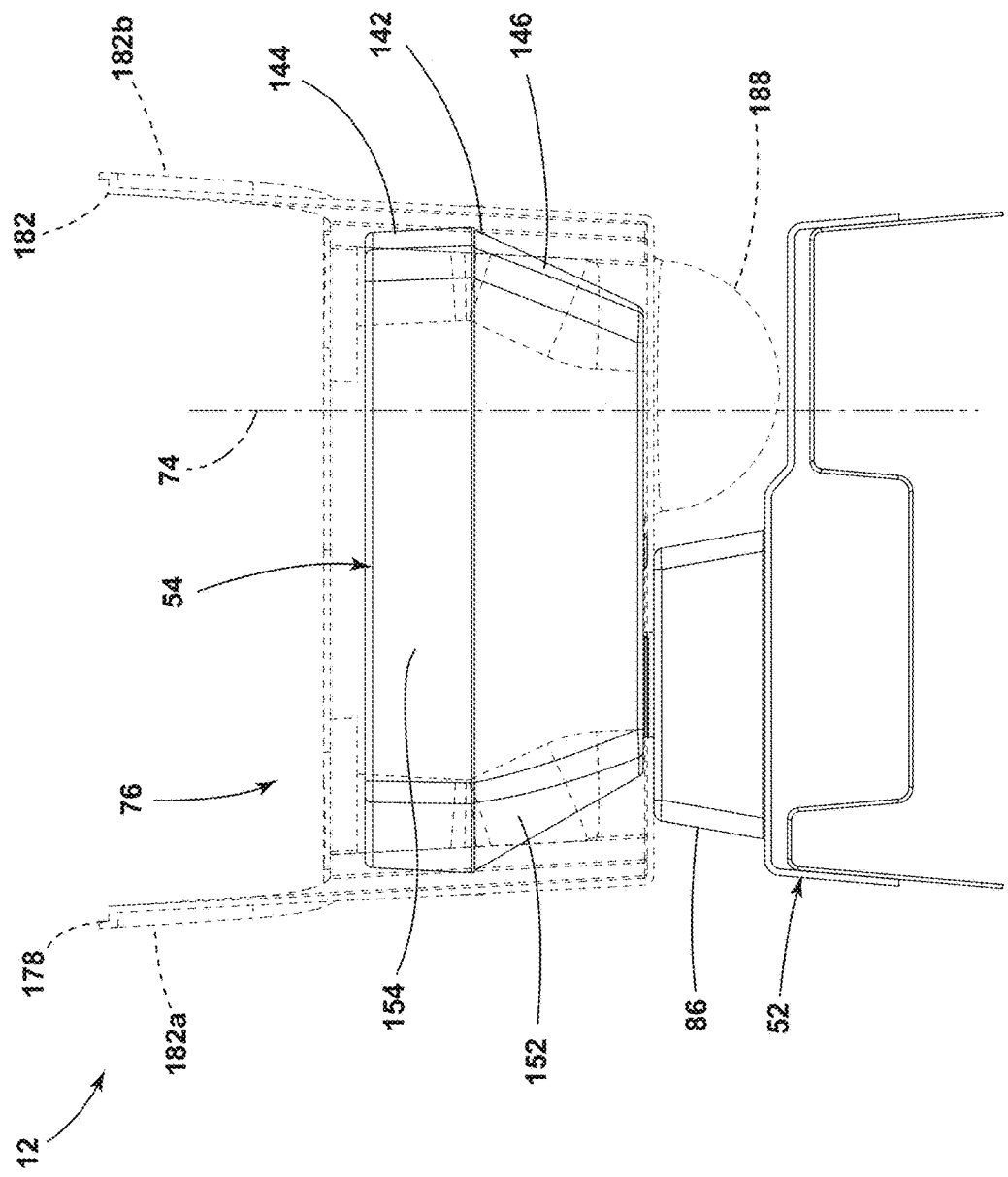
FIG. 7 is a forward view of the reconfigurable cup holder assembly of FIG. 1 with the storage bin in phantom.
Figure 8:
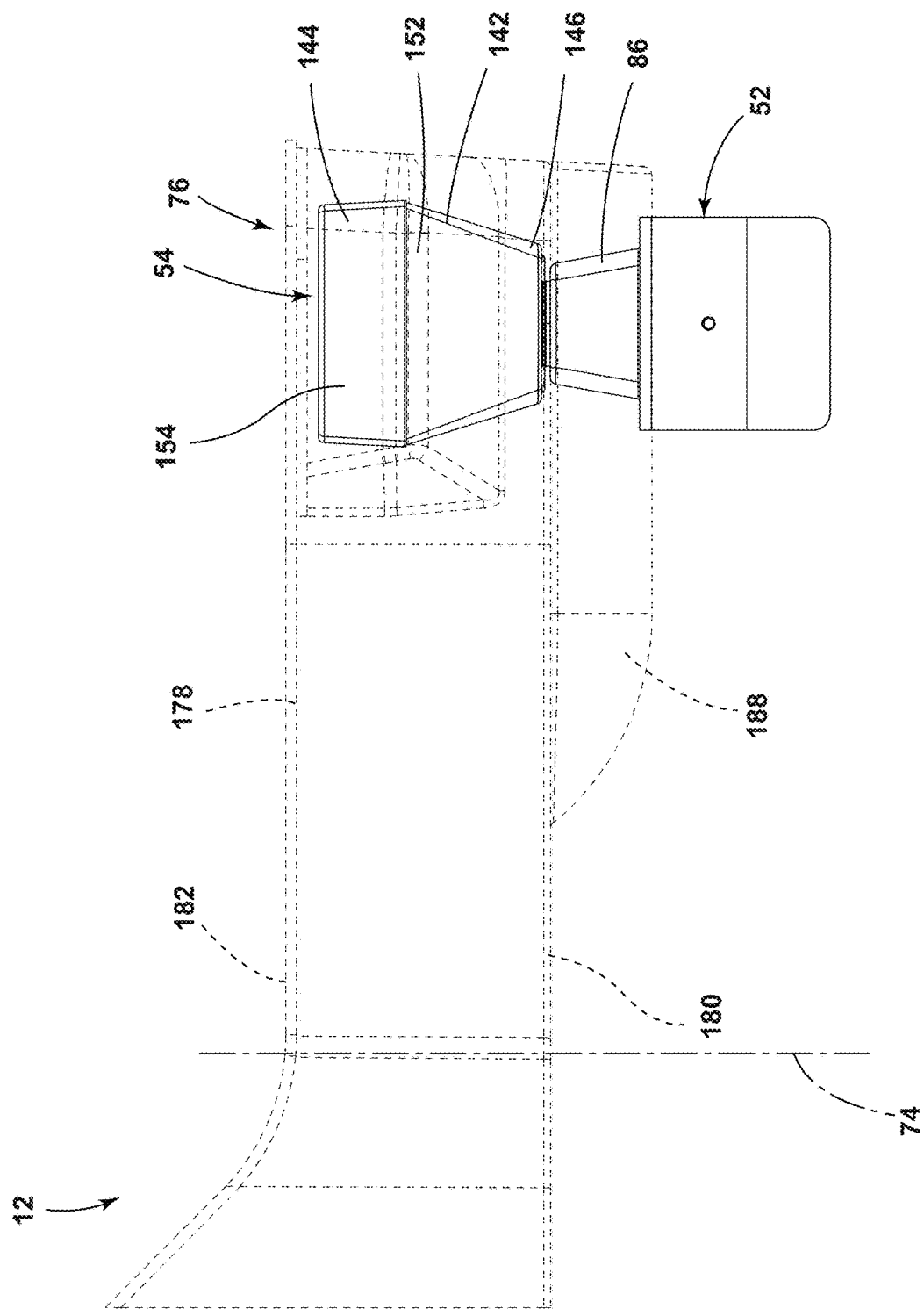
FIG. 8 is a side view of the reconfigurable cup holder assembly of FIG. 1 with the storage bin in phantom.
Figure 9:
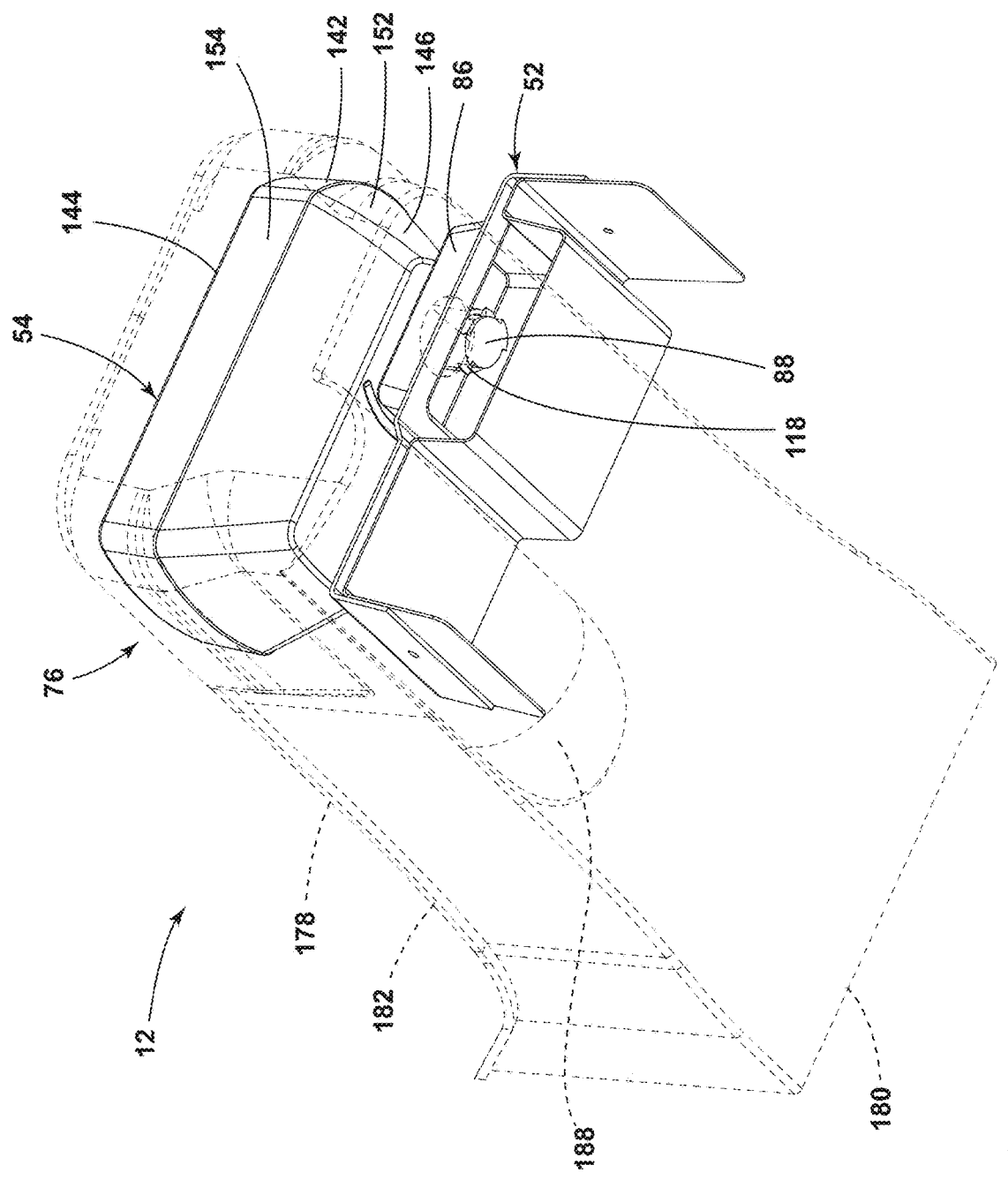
FIG. 9 is a bottom view of the reconfigurable cup holder assembly of FIG. 1 with the storage bin in phantom, illustrating the pivot bracket having a receiver, which has received a snap-fit element of a support bar that is attached to the cup holder portion and rotates about the pivot axis within the receiver.
Figure 10:
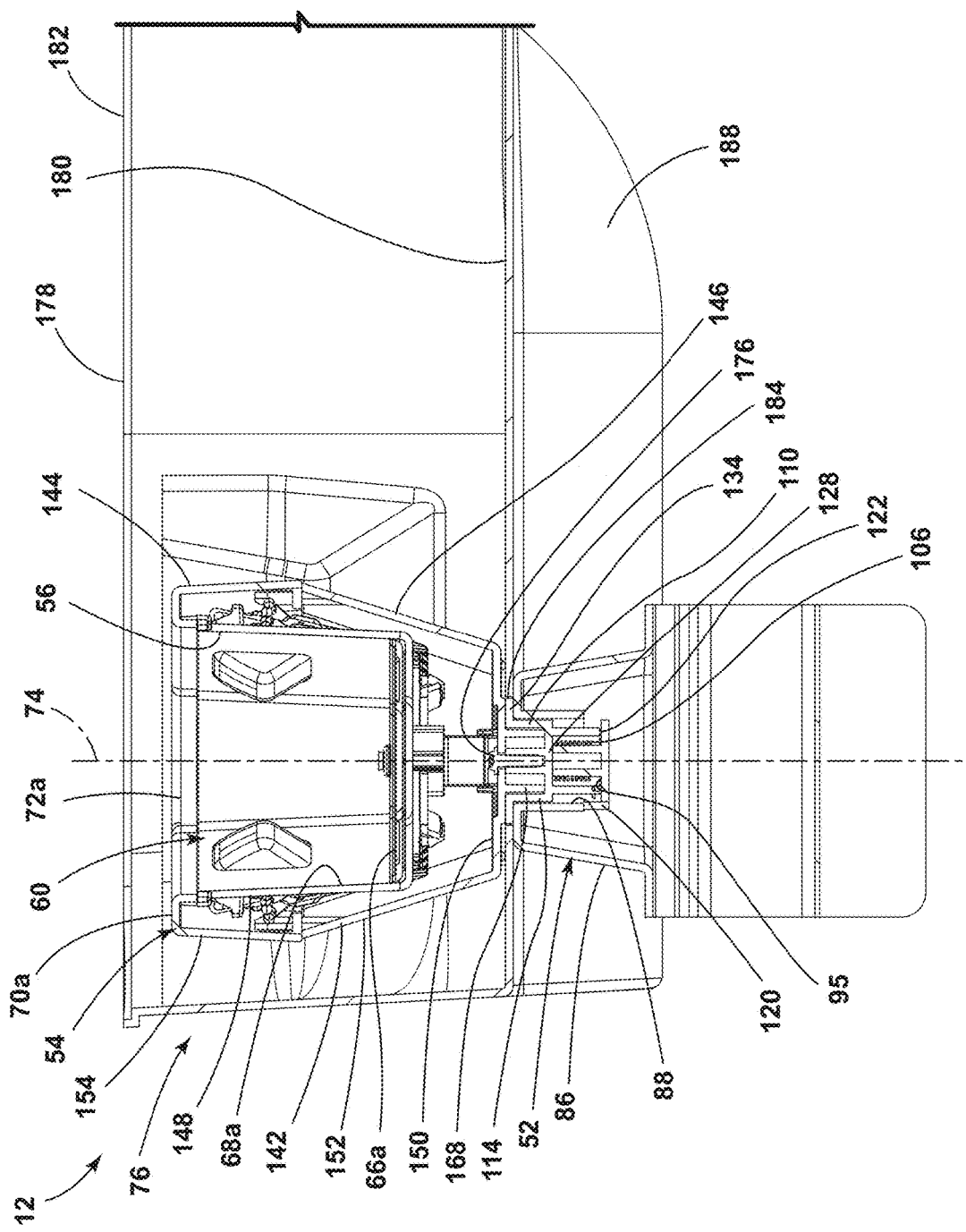
FIG. 10 is an elevation view of a cross-section of the reconfigurable cup holder assembly of FIG. 1 taken through line X-X of FIG. 3A, illustrating the cup holder portion projecting into the support bar, which extends through an aperture through a bottom wall of the storage bin and into the receiver of the pivot bracket to allow the cup holder portion to rotate about the pivot axis relative to the storage bin and the pivot bracket.
Figure 11:
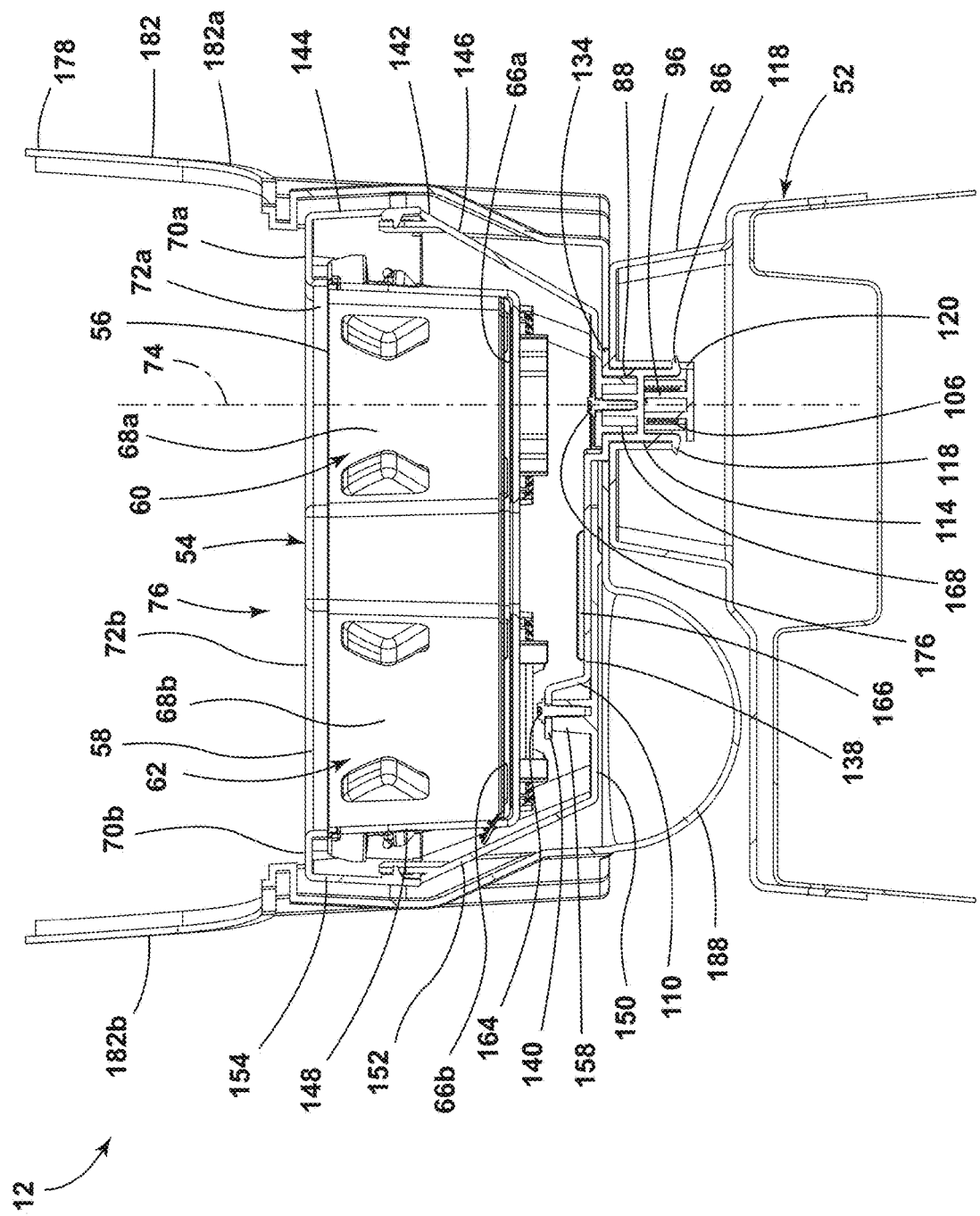
FIG. 11 is an elevation view of a cross-section of the reconfigurable cup holder assembly of FIG. 1 taken through line XI-XI of FIG. 3A, illustrating an end of the support bar attached to a bottom section of a housing of the cup holder portion below the second cup holder.

Referring now additionally to FIGS. 2A and 2B, in embodiments, the vehicle 10 further includes a row of seating 32. The row of seating 32 includes a first seating assembly 34 and a second seating assembly 36. The first seating assembly 34 is configured to support the passenger 22, with a seat 38 and a seatback 40. The second seating assembly 36 is configured to support another passenger 22a, with a seat 38a and a seatback 40a. In embodiments, the reconfigurable cup holder assembly 12 is disposed between the first seating assembly 34 and the second seating assembly 36. In embodiments, the reconfigurable cup holder assembly 12 is deposed inboard relative to the first seating assembly 34 and inboard relative to the second seating assembly 36. In embodiments, the vehicle 10 further includes a center console 42, and the reconfigurable cup holder assembly 12 is disposed at the center console 42.

In embodiments, the vehicle 10 further includes a row of seating 44. This row of seating 44 includes a common seat portion 46. The common seat portion 46 is configured to support more than one passenger 22 of the vehicle 10 (e.g., passengers 22b-22c). In embodiments, the reconfigurable cup holder assembly 12 comprises a stowed position 48 (FIG. 2A) and a usable position 50 (FIG. 2B). This disclosure further addresses the stowed positon 48 and the usable position 50 below.

Referring now additionally to FIGS. 3A-11, the reconfigurable cup holder assembly 12 includes a base structure 52 (see, e.g., FIG. 4) and a cup holder portion 54. As will be detailed herein, the position of the cup holder portion 54 relative to the base structure 52 can be changed. The base structure 52 supports the cup holder portion 54—that is, the cup holder portion 54 has a weight, and the base structure 52 bears the weight of the cup holder portion 54.

The cup holder portion 54 includes at least a first cup holder 56 and a second cup holder 58. Each of the first cup holder 56 and the second cup holder 58 define a space 60, 62, respectively, that is configured to hold a container for liquid 64a, 64b, respectively (see FIG. 4). More specifically, the first cup holder 56 defines the space 60. The space 60 is configured to hold the container for liquid 64a. Similarly, the second cup holder 58 defines the space 62. The space 62 is configured to hold the container for liquid 64b. The containers for liquid 64a, 64b can be a bottle that a passenger 22 can selectively open and close to access liquid therein. Examples include soda bottles, water bottles, baby bottles, "sippy-cups," and so on. Other examples of the containers for liquid 64a, 64b include cups with an open top (e.g., a coffee cup). In embodiments, the spaces 60, 62 are configured to hold the containers for liquid 64a, 64b because each space 60, 62 is at least partially defined by a bottom surface 66a, 66b and a side wall 68a, 68b extending upward from the bottom surface 66a, 66b—the side wall 68a, 68b terminating at a top 70a, 70b that defines an opening 72a, 72b into the space 60, 62. The bottom surfaces 66a, 66b support the containers for liquid 64a, 64b, respectively, and prevent the containers for liquid 64a, 64b from falling into volumes of the vehicle 10 inaccessible to the passenger 22 (e.g., below the center console 42). In embodiments, as illustrated, the bottom surface 66a is contiguous with the bottom surface 66b. However, the bottom surfaces 66a, 66b need not be contiguous. The side walls 68a, 68b limit lateral, forward, and rearward movement of the containers for liquid 64a, 64b, respectively, and help maintain the containers for liquid 64a, 64b in an upright position. In embodiments, the side walls 68a, 68b are substantially orthogonal to (i.e., form an angle within a range of 75 degrees to 95 degrees with,) the bottom surfaces 66a, 66b from which the side walls 68a, 68b extend. The openings 72a, 72b into the spaces 60, 62 allow the passenger 22 to insert and remove selectively the containers for liquid 64a, 64b from the spaces 60, 62. The spaces 60, 62 are thusly configured to hold the containers for liquid 64a, 64b.

The cup holder portion 54 is pivotably coupled to the base structure 52. The cup holder portion 54 pivots relative to the base structure 52 about a pivot axis 74. The cup holder portion 54 is pivotable about the pivot axis 74 to, from, and between (i) a first position 76 (see, e.g., FIG. 3A) relative to the base structure 52, and (ii) a second position 78 (see, e.g., FIG. 3B) relative to the base structure 52. The first position 76 is different than the second position 78. The second cup holder 58 pivots an angle $\beta$ (see FIG. 3B) when the cup holder portion 54 moves from the first position 76 to the second position 78. For example, a point 80 (see FIGS. 3A, 3B) on the bottom surface 66b of the second cup holder 58 moves throughout the angle β while moving from the first position 76 to the second position 78. In embodiments, the angle β is greater than or equal to 75 degrees. In embodiments, angle β is within a range of 75 degrees to 105 degrees. In other embodiments, the angle β is less than 75 degrees or more than 105 degrees. In other words, the second cup holder 58 is pivotable about the pivot axis 74 throughout the angle β, which in embodiments is greater than or equal to 75 degrees.

The pivot axis 74 extends through the space 60 that the first cup holder 56 of the cup holder portion 54 defines. In embodiments, such as that illustrated, the pivot axis 74 extends through the bottom surface 66a of the first cup holder 56 of the cup holder portion 54. In embodiments, the side wall 68a of the first cup holder 56 of the cup holder portion 54 does not intersect with the pivot axis 74. The pivot axis 74 extends through the opening 72a into the space 60 that the first cup holder 56 defines. When the first cup holder 56 is holding the container for liquid 64a, the pivot axis 74 extends through the container for liquid 64a. In embodiments, the pivot axis 74 is either vertically oriented or varies from vertical 82 by an angle α (see FIG. 2B) of less than or equal to 10 degrees.

In embodiments, in the first position 76, the second cup holder 58 is disposed laterally from the first cup holder 56. Stated another way, a plane (not illustrated) extending vertically through both the first cup holder 56 and the second cup holder 58, such as through a line 84 extending between (i) the pivot axis 74 at the bottom surface 66a of the first cup holder 56, and (ii) the point 80 at the bottom surface 66b of the second cup holder 58 (see FIG. 3B), is disposed more orthogonally to the forward direction 16 while in the first position 76 than while in the second position 78. The plane can form an angle within a range of 80 degrees to 100 degrees, such as 90 degrees, relative to the forward direction 16, while the cup holder portion 54 is in the first position 76. Thus, when the reconfigurable cup holder assembly 12 is disposed between the first seating assembly 34 and the second seating assembly 36, such as illustrated at FIGS. 2A and 2B, when the cup holder portion 54 is in the first position 76, (i) the first cup holder 56 is disposed closer to the second seating assembly 36 than the second cup holder 58, and (ii) the second cup holder 58 is disposed closer to the first seating assembly 34 than the first cup holder 56.

In embodiments, in the second position 78, the second cup holder 58 is disposed in the forward direction 16 or the rearward direction 18 of first cup holder 56. Stated another away, in embodiments, the plane described in the previous paragraph extending through both the first cup holder 56 and the second cup holder 58 forms an angle within a range of 10 degrees relative to the forward direction 16. In embodiments, the plane is parallel to the forward direction 16. In embodiments, the plane moves through a range greater than or equal to 75 degrees while the cup holder portion 54 moves from the first position 76 to the second position 78.

As mentioned above, in embodiments, the reconfigurable cup holder assembly 12 includes the stowed position 48 (FIG. 2A) and the usable position 50 (FIG. 2B). In the stowed position 48, the cup holder portion 54 is inaccessible from the row of seating 44. In other words, the passengers 22b, 22c occupying the row of seating 44 cannot place the container for liquid 64a into either of the spaces 60, 62 that the first cup holder 56 and the second cup holder 58 define. In contrast, in the usable position 50, the reconfigurable cup holder assembly 12 is disposed over the common seat portion 46 of the row of seating 44 and the cup holder portion 54 is accessible from the row of seating 44. In other words, the passengers 22b, 22c occupying the row of seating 44 can place the container for liquid 64a into either of the spaces 60, 62 that the first cup holder 56 and the second cup holder 58 define.

Figure 12:
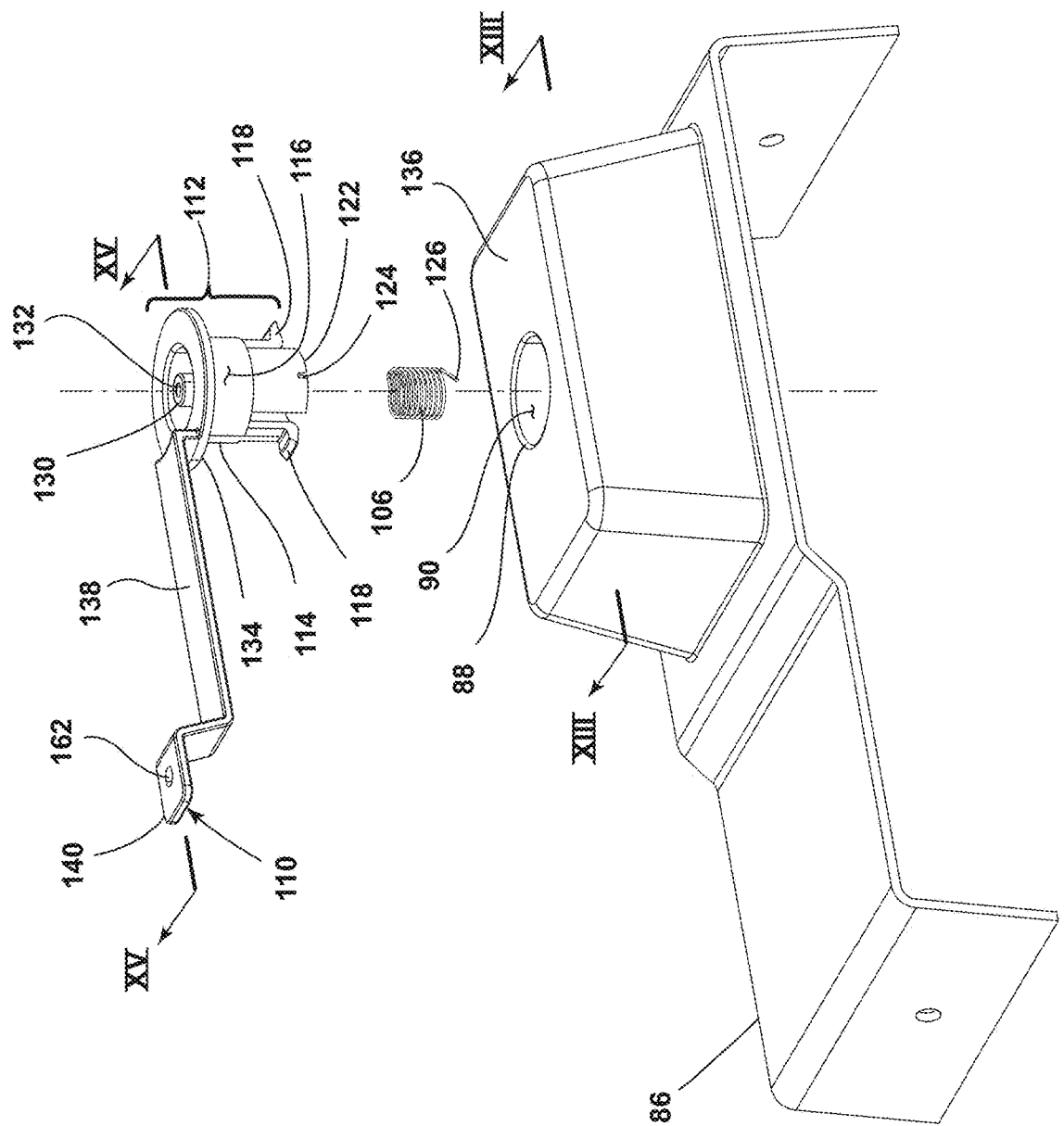
FIG. 12 is a perspective exploded view of the support bar and the pivot bracket.
Figure 13:
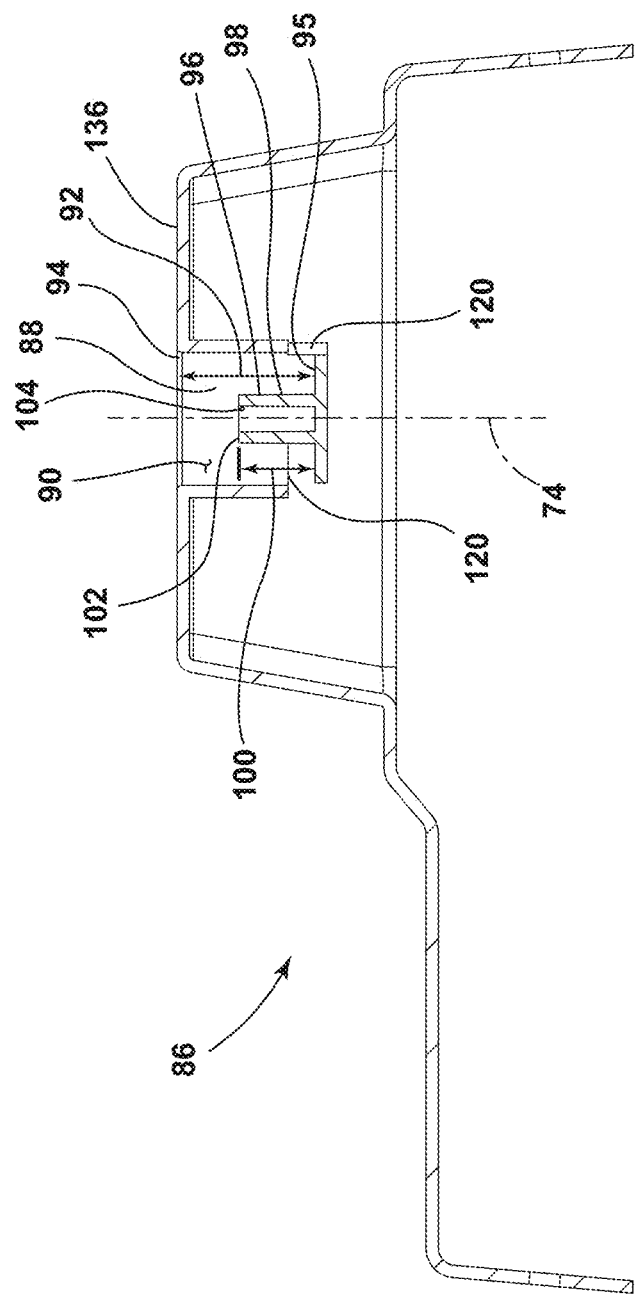
FIG. 13 is an elevation view of a cross-section of the pivot bracket taken through line XIII-XIII of FIG. 12, illustrating the receiver including a cylinder extending up from a bottom that faces a radial surface of the receiver.
Figure 14:
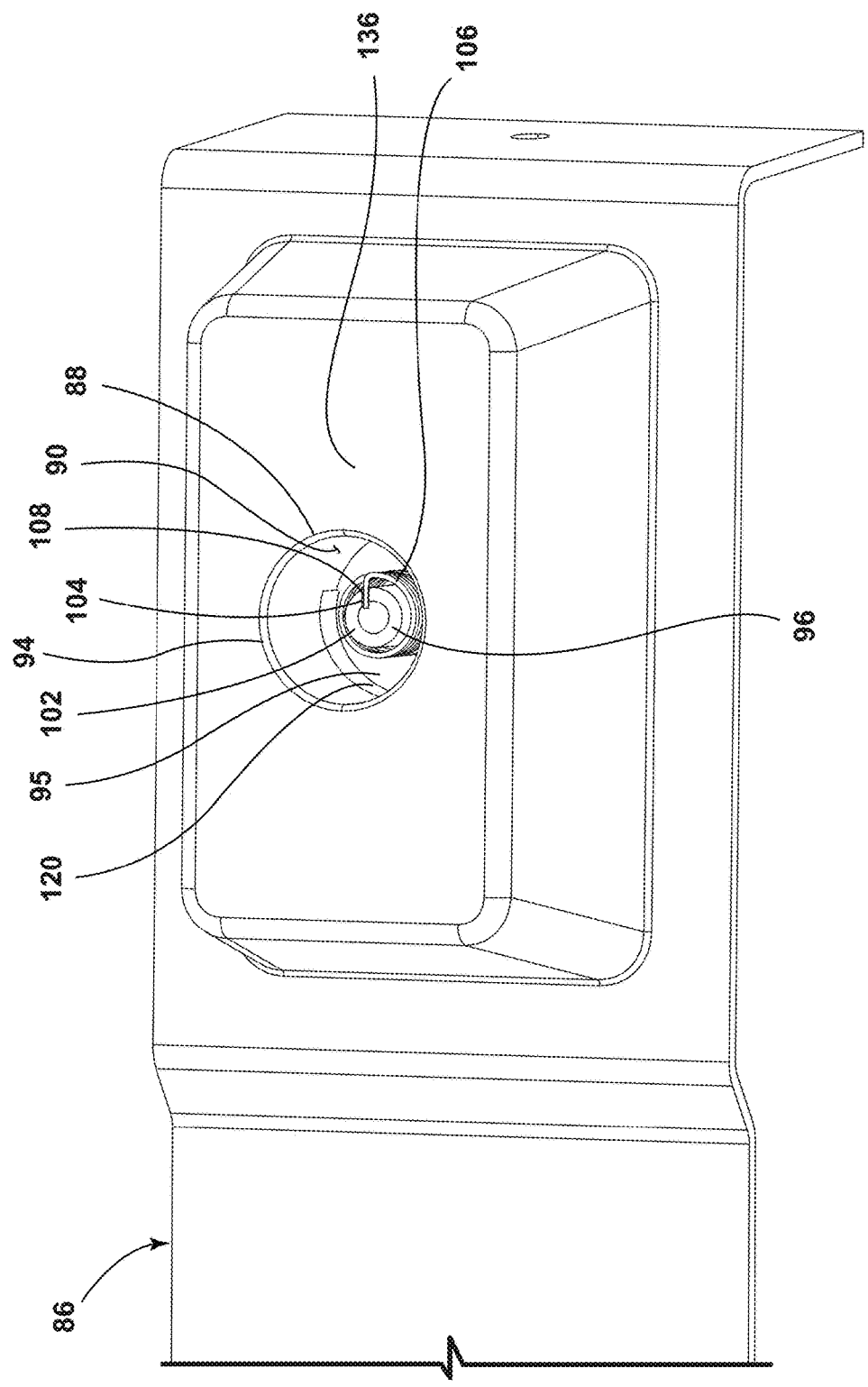
FIG. 14 is a perspective overhead view of the pivot bracket, illustrating a spring with a first end inserted into a notch at a top of the cylinder of the receiver.

Referring now additionally to FIGS. 12-14, in embodiments, the base structure 52, to which the cup holder portion 54 is pivotably coupled, includes a pivot bracket 86. The pivot bracket 86 is at least partially under the first cup holder 56 of the cup holder portion 54. The pivot bracket 86 includes a receiver 88 through which the pivot axis 74 extends. A radial surface 90 bounds the receiver 88 along a height 92 parallel with the pivot axis 74. The height 92 of the receiver 88 extends from an opening 94 of the receiver 88 to a bottom 95 of the receiver 88.

In embodiments, the receiver 88 of the pivot bracket 86 includes a cylinder 96 extending upward from the bottom 95 of the receiver 88. The pivot axis 74 extends through the cylinder 96. The cylinder 96 has an outer surface 98 that is radial about the pivot axis 74. The outer surface 98 of the cylinder 96 faces the radial surface 90. The cylinder 96 has a height 100 from the bottom 95 that is less than the height 92 of the receiver 88. The cylinder 96 further includes a top 102 and a notch 104 into the top 102.

Figure 15:
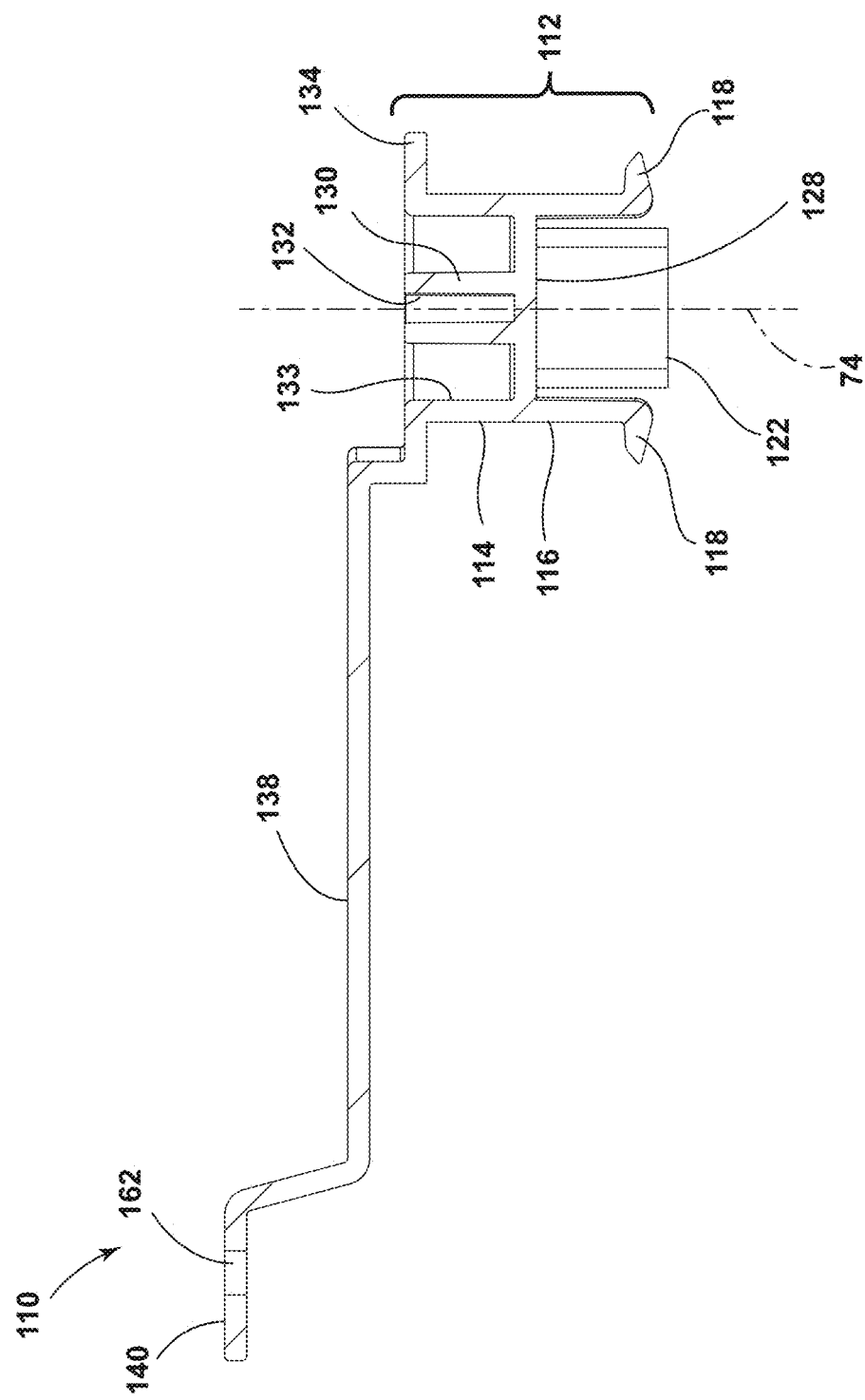
FIG. 15. is an elevation view of a cross-section of the support bar taken through line XV-XV of FIG. 12, illustrating a bracket attachment section of the support bar including a cylindrical portion with a lateral wall extending inward, and a projection extending upward from the lateral wall.

Referring now additionally to FIG. 15, in embodiments, the reconfigurable cup holder assembly 12 further includes a support bar 110. The support bar 110 includes a bracket attachment section 112. The bracket attachment section 112 attaches to the pivot bracket 86. More specifically, the bracket attachment section 112 includes a cylindrical portion 114. The cylindrical portion 114 is disposed and rotatable within the receiver 88 of the pivot bracket 86. The pivot axis 74 extends through the cylindrical portion 114. An outer surface 116 of the cylindrical portion 114 is radial from the pivot axis 74 and faces the radial surface 90 of the receiver 88 of the pivot bracket 86. The bracket attachment section 112 further includes snap-fit elements 118. The bracket attachment section 112 of the support bar 110 is introduced into the receiver 88 of the pivot bracket 86 through the opening 94, and the bracket attachment section 112 is forced into the receiver 88 until the snap-fit elements 118 snap into cooperating slots 120 of the receiver 88 of the pivot bracket 86 disposed into or through the radial surface 90. The slots 120 can be disposed adjacent to the bottom 95 of the receiver 88 of the pivot bracket 86. The snap-fit elements 118 cooperating with the slots 120 resist withdrawal of the bracket attachment section 112 of the support bar 110 from the receiver 88 of the pivot bracket 86. However, the slots 120 are oversized radially about the pivot axis 74 to permit rotation of the support bar 110 about the pivot axis 74.

In embodiments, a spring 106 or a spring 190 (see FIGS. 19A-19E) assists the movement of the cup holder portion 54 to the first position 76 always, to the second position 78 always, or either the first position 76 or the second position 78 depending on the relative location of the cup holder portion 54 between the first position 76 and the second position 78. In embodiments, the spring 106 is a torsion spring that resists the movement of the cup holder portion 54 away from the first position 76 and biases always the cup holder portion 54 to the first position 76. A friction fit or some other securing device is thus necessary in those embodiments to secure the cup holder portion 54 in the second position 78. Once the friction fit or securing device is released, the spring 106 biases the cup holder portion 54 back to the first position 76.

In other embodiments, the spring 106 is a torsion spring that resists the movement of the cup holder portion 54 away from the second position 78 and biases always the cup holder portion 54 to the second position 78. A friction fit or some other securing device is thus necessary in those embodiments to secure the cup holder portion 54 in the first position 76. Once the friction fit or securing device is released, the spring 106 biases the cup holder portion 54 back to the second position 78.

In embodiments, such as illustrated, the spring 106 is disposed around the cylinder 96, between the outer surface 98 of the cylinder 96 and the radial surface 90 of the receiver 88. The spring 106 includes a first end 108. The first end 108 is disposed within the notch 104 into the top 102 of the cylinder 96. The cylindrical portion 114 of the bracket attachment section 112 of the support bar 110 includes a bottom 122 closest to the bottom 95 of the receiver 88 of the pivot bracket 86. The cylindrical portion 114 further includes a notch 124 into the bottom 122. The spring 106 further includes a second end 126, and the second end 126 is disposed in the notch 124. The spring 106 can be oriented to energize as the cup holder portion 54 rotates about the pivot axis 74 from the first position 76 to the second position 78, or from the second position 78 to the first position 76, as desired. In embodiments, the spring 106 is an over-center variety that biases the cup holder portion 54 in the present position of the cup holder portion 54, whether the cup holder portion 54 is presently in the first position 76 or the second position 78. Assume for example that the cup holder portion 54 is in the first position 76. The spring 106 (as the over-center variety) energizes and resists movement away from the first position 76 until the cup holder portion 54 is moved at least half-way to the second position 78. The spring 106 then energizes the other way and biases the cup holder portion 54 to the second position 78. The spring 106 works in the same manner then to resist movement of the cup holder portion 54 away from the second position 78.

The cylindrical portion 114 of the bracket attachment section 112 of the support bar 110 further includes a lateral wall 128 inward from the outer surface 116 toward the pivot axis 74. The lateral wall 128 extends over the cylinder 96 extending outward from the bottom 95 of the receiver 88 of the pivot bracket 86. The spring 106 is disposed above the bottom 95 of the receiver 88 of the pivot bracket 86 and below the lateral wall 128 of the cylindrical portion 114 of the bracket attachment section 112 of the support bar 110.

The cylindrical portion 114 of the bracket attachment section 112 of the support bar 110 further includes a projection 130. The projection 130 extends upwards from the lateral wall 128. The pivot axis 74 extends through the projection 130. The projection 130 includes an aperture 132. The pivot axis 74 extends through the aperture 132. The cylindrical portion 114 has an inner surface 133 that faces the projection 130 above the lateral wall 128.

The bracket attachment section 112 of the support bar 110 further includes a flange 134 extending radially outward from the outer surface 116 of the cylindrical portion 114. The flange 134 is disposed over and may sit upon a top 136 of the pivot bracket 86 near the opening 94 of the receiver 88 of the pivot bracket 86.

The support bar 110 further includes a bar section 138. The bar section 138 extends outward from the bracket attachment section 112 of the support bar 110 and from the pivot axis 74. The bar section 138 terminates at an end 140. The end 140 of the bar section 138 is disposed under the second cup holder 58 of the cup holder portion 54.

Figure 16:
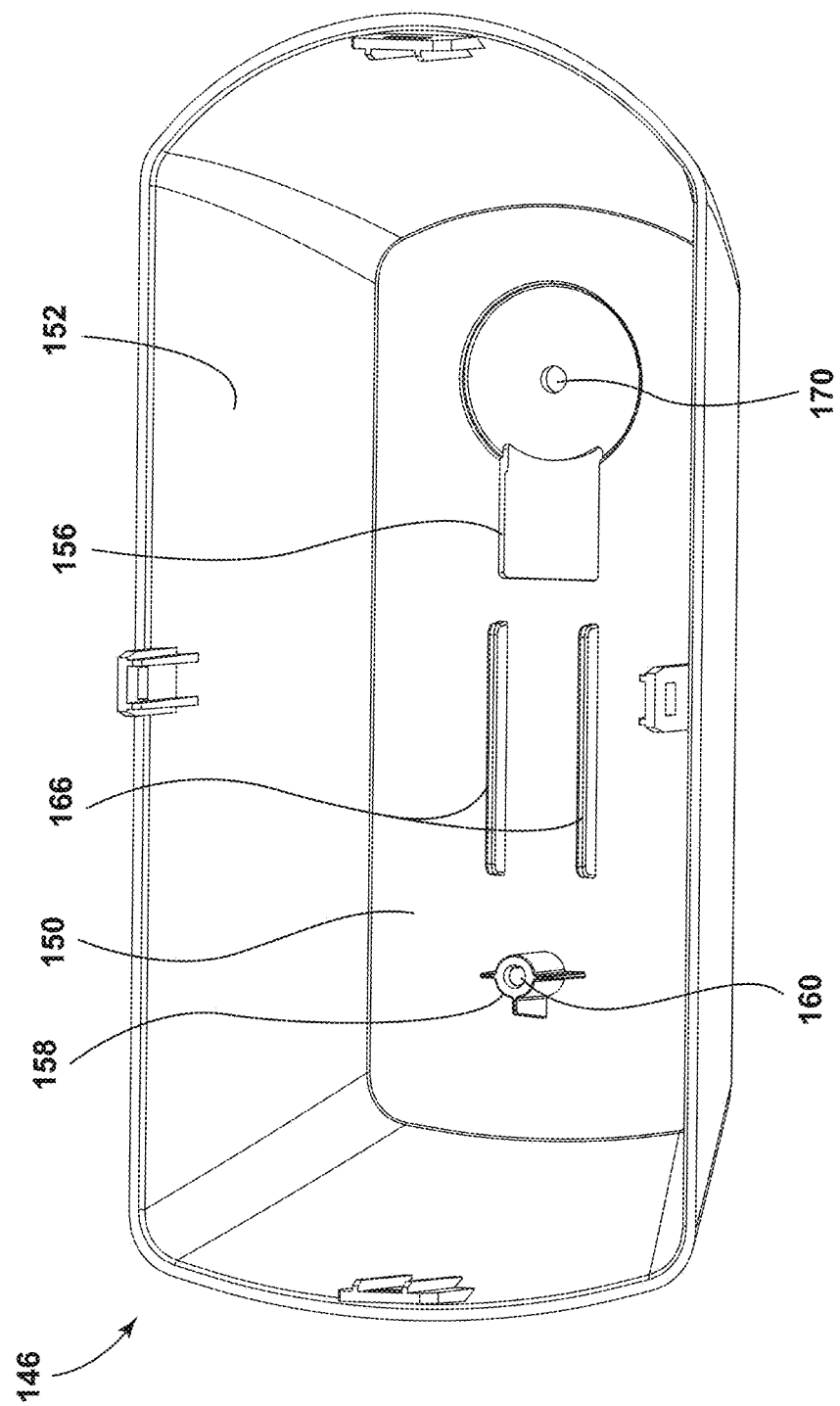
FIG. 16 is an overhead perspective view of the bottom section of the housing of the cup holder portion, illustrating a slot through which the support bar extends, a projection extending upward from a bottom wall that attaches to the end of the support bar as mentioned with FIG. 11, and an aperture through the bottom wall through which a fastener extends to attach the bottom wall again to the bracket attachment section of the support bar.
Figure 17:
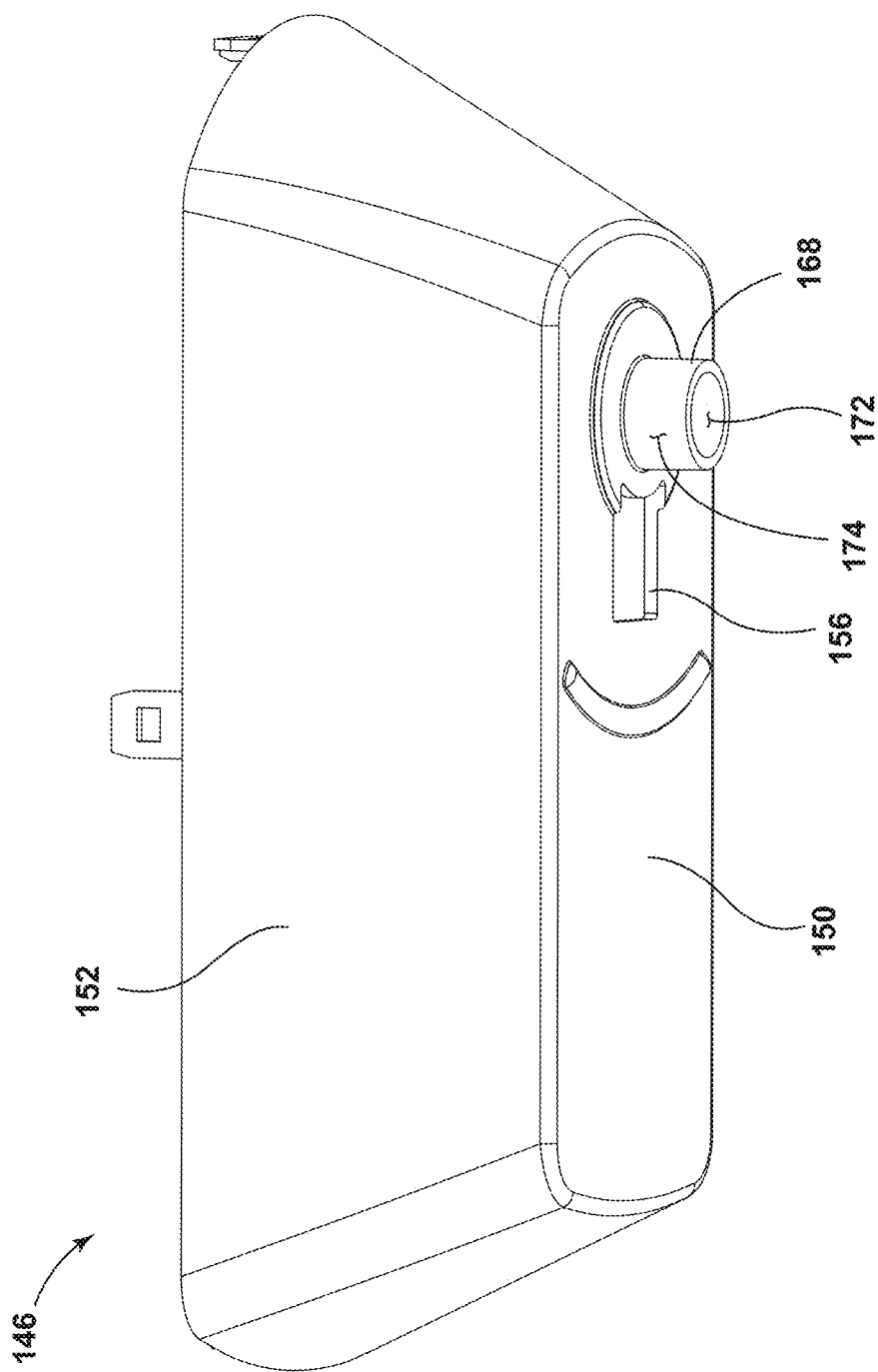
FIG. 17 is bottom perspective view of the bottom section of the housing of the cup holder portion, illustrating a cylindrical projection extending downward from the bottom wall.

Referring now additionally to FIGS. 16 and 17, in embodiments, the cup holder portion 54 of the reconfigurable cup holder assembly 12 further includes a housing 142 that at least partially houses the side wall 68a and the bottom surface 66a of the first cup holder 56 and the side wall 68b and the bottom surface 66b of the second cup holder 58. In embodiments, as illustrated, the housing 142 includes a top section 144 attached to a bottom section 146, and a housed piece 148 provides the side wall 68a and the bottom surface 66a of the first cup holder 56 and the side wall 68b and the bottom surface 66b of the second cup holder 58. The top section 144 of the housing 142 in embodiments as illustrated defines the openings 72a, 72b of the first cup holder 56 and the second cup holder 58. The bottom section 146 of the housing 142 includes a bottom wall 150 and a side wall 152 extending upward from the bottom wall 150. The bottom wall 150 of the bottom section 146 of the housing 142 extends under the bottom surface 66a of the first cup holder 56 and the bottom surface 66b of the second cup holder 58. The side wall 152 of the bottom section 146 of the housing 142 at least partially surrounds the side walls 68a, 68b of the first cup holder 56 and the second cup holder 58. The top section 144 of the housing 142 defines the top 70a, 70b of the first cup holder 56 and the second cup holder 58. The top section 144 of the housing 142 further includes a side wall 154 extending downward from the top 70a, 70b. The side wall 154 of the top section 144 of the housing 142 at least partially surrounds the side walls 68a, 68b of the first cup holder 56 and the second cup holder 58. The side wall 154 of the top section 144 of the housing 142 is attached to the side wall 152 of the bottom section 146 of the housing 142. The housed piece 148 is attached to the top section 144 of the housing 142.

In embodiments, the second cup holder 58 of the cup holder portion 54 is not cantilevered fully relative to the first cup holder 56. If the second cup holder 58 were fully cantilevered, the cup holder portion 54 would tilt downward away from the pivot axis 74. To resist this, various structural components can be included within the housing 142.

In embodiments, such as illustrated, the bottom section 146 of the housing 142 is attached to the support bar 110, which resists titling of the cup holder portion 54 downward away from the pivot axis 74. The bottom section 146 of the housing 142 includes a slot 156 through the bottom wall 150. The support bar 110 extends through the slot 156. The bar section 138 of the support bar 110 is at least partially above the bottom wall 150 of the bottom section 146 of the housing 142. The bottom section 146 of the housing 142 further includes a projection 158 extending upward from the bottom wall 150. The projection 158 has an aperture 160. The projection 158 is disposed beneath the bottom surface 66b of the second cup holder 58. The end 140 of the bar section 138 of the support bar 110 includes an aperture 162. The end 140 of the bar section 138 of the support bar 110 is disposed above the projection 158, with the aperture 162 of the end 140 of the bar section 138 in-line with the aperture 160 of the projection 158 of the bottom section 146 of the housing 142. A fastener 164 extends through the aperture 162 of the end 140 of the bar section 138 of the support bar 110 and into the aperture 160 of the projection 158 of the bottom section 146 of the housing 142, thus attaching the support bar 110 and the housing 142 of the cup holder portion 54 together. The end 140 of the bar section 138 of the support bar 110 is thus disposed between the bottom surface 66b of the second cup holder 58 and the bottom wall 150 of the housing 142 of the cup holder portion 54. The bottom section 146 of the housing 142 further includes a pair of guide rails 166 that extend upward from the bottom wall 150 between the projection 158 and the slot 156. The bar section 138 of the support bar 110 is disposed between the pair of guide rails 166.

The bottom section 146 of the housing 142 further includes a cylindrical projection 168 extending downward from the bottom wall 150 and an aperture 170 through the bottom wall 150 into the cylindrical projection 168. The pivot axis 74 extends through the cylindrical projection 168 and the aperture 170. The cylindrical projection 168 has an inner surface 172 facing the pivot axis 74. The cylindrical projection 168 has an outer surface 174 facing away from the pivot axis 74. The cylindrical projection 168 projects into the cylindrical portion 114 of the bracket attachment section 112 of the support bar 110. The cylindrical projection 168 is disposed above the lateral wall 128 of the cylindrical portion 114 of the bracket attachment section 112 of the support bar 110. The outer surface 174 of the cylindrical projection 168 faces the inner surface 133 of the cylindrical portion 114 of the bracket attachment section 112 of the support bar 110. The inner surface 172 of the cylindrical projection 168 faces the projection 130 extending upward from the lateral wall 128 of the cylindrical portion 114 of the bracket attachment section 112 of the support bar 110. The aperture 170 through the bottom wall 150 and the aperture 132 in the projection 130 are in-line centered about the pivot axis 74. A fastener 176 extends from above the bottom wall 150 of the bottom section 146 of the housing 142, through the aperture 170, and into the aperture 132 in the projection 130 of the bracket attachment section 112 of the support bar 110. The housing 142 of the cup holder portion 54 is thus attached to the support bar 110 at two different places—(i) under the first cup holder 56 via the fastener 176, and (ii) under the second cup holder 58 via the fastener 164.

Figure 18:
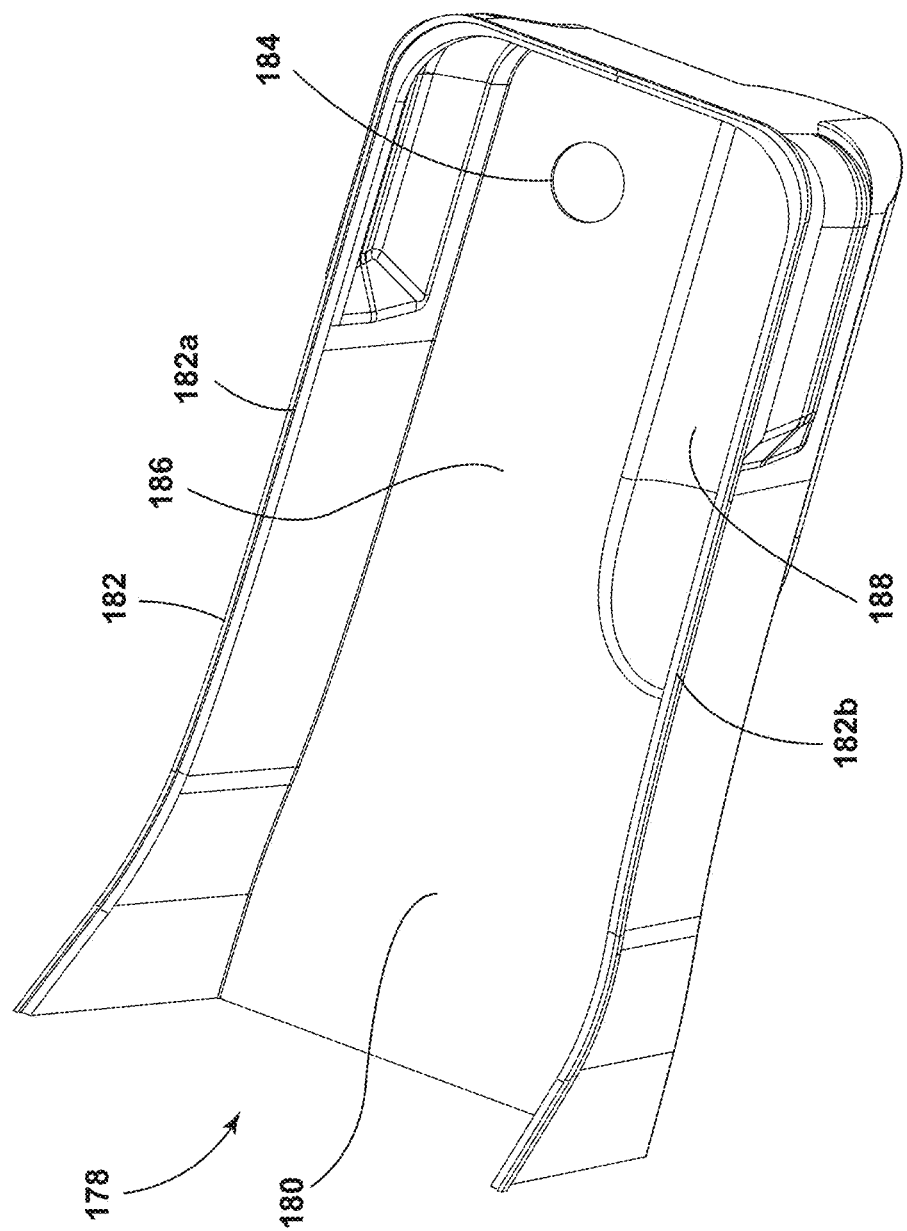
FIG. 18 is an overhead perspective view of the storage bin, illustrating the aperture through the bottom wall, through which the cylindrical projection of the bottom section of the housing of the cup holder portion extends, and the bottom wall having a flat portion and the valley portion.

Referring now additionally to FIG. 18, in embodiments, the base structure 52 further includes a storage bin 178. The storage bin 178 includes a bottom wall 180 and a side wall 182 that extends upwardly from the bottom wall 180. The bottom wall 180 is disposed under both the first cup holder 56 and the second cup holder 58, when the cup holder portion 54 is in the first position 76 and when the cup holder portion 54 is in the second position 78. The side wall 182 faces the side wall 152 of the bottom section 146 of the housing 142 and the side wall 154 of the top section 144 of the housing 142 of the cup holder portion 54. The side wall 182 includes portions 182a, 182b that face each other. The cup holder portion 54 is disposed between the portions 182a, 182b.

The storage bin 178 further includes an aperture 184 through the bottom wall 180. The pivot axis 74 extends through the aperture 184. The bottom wall 180 of the storage bin 178 sits upon the top 136 of the pivot bracket 86. The pivot bracket 86 is thus disposed under the bottom wall 180 of the storage bin 178. The cylindrical portion 114 of the bracket attachment section 112 of the support bar 110 is disposed through aperture 184 through the bottom wall 180 of the storage bin 178. The aperture 184 through the bottom wall 180 of the storage bin 178 radially surrounds the flange 134 of the bracket attachment section 112 of the support bar 110. The bar section 138 of the support bar 110 is disposed above the bottom wall 180 of the storage bin 178.

In embodiments, the bottom wall 180 of the storage bin 178 includes a flat portion 186 and a valley portion 188. The valley portion 188 is a curved decrease in elevation in the bottom wall 180 relative to the flat portion 186. When the cup holder portion 54 is in the first position 76 (FIG. 3A), the first cup holder 56 is disposed over the flat portion 186 and the second cup holder 58 is disposed over the valley portion 188. When the cup holder portion 54 is in the second position 78 (FIG. 3B), the first cup holder 56 is disposed over the flat portion 186 and the second cup holder 58 is disposed over the flat portion 186 as well. Thus, when the cup holder portion 54 is in the second position 78, greater access to the valley portion 188 from an environment external to the reconfigurable cup holder assembly 12 (such as the interior 24 of the vehicle 10) is allowed compared to when the cup holder portion 54 is in the first position 76. For example, when the cup holder portion 54 is in the second position 78, the passenger 22 can place another container for liquid (not illustrated), side down, over the valley portion 188. The valley portion 188 will relatively maintain the position of the container of liquid side down within the storage bin 178 without the container of liquid rolling around indiscriminately on the bottom wall 180 of the storage bin 178. Even when the cup holder portion 54 is in the first position 76, the passenger 22 can store an item (not illustrated) within the valley portion 188 (e.g., a phone, coin money).

In other embodiments, the bottom wall 180 of the storage bin 180 includes the flat portion 186 but no valley portion 188. In still other embodiments, the storage bin 180 further includes additional vertical cup holders, not separately illustrated, but similar to the first cup holder 56 and the second cup holder 58, and/or storage pockets. When the cup holder portion 54 is in the second position 78, greater access to the additional vertical cup holder or storage pockets from an environment external to the reconfigurable cup holder assembly 12 (such as the interior 24 of the vehicle 10) is allowed compared to when the cup holder portion 54 is in the first position 76.

Referring now to FIGS. 19A-19E, in a variation of the reconfigurable cup holder assembly 12, instead of utilizing the spring 106, a reconfigurable cup holder assembly 12A utilizes the spring 190. The spring 190 includes a first end 192, a second end 194, and a wound portion 196 disposed between the first end 192 and the second end 194. The first end 194 of the spring 190 is pivotably attached to a pin 198 extending up from the bottom wall 150 of the bottom section 146 of the housing 142. The wound portion 196 is disposed above the bottom wall 150 of the bottom section 146 of the housing 142. A pin 200 extends upward from the bottom wall 180 of the storage bin 178 and through an arcuate slot 202 through the bottom wall 150 of the bottom section 146 of the housing 142. The second end 194 of the spring 190 is pivotably attached to the pin 200. The reconfigurable cup holder assembly 12A is otherwise identical to the reconfigurable cup holder assembly 12, except to the extent that the shape of the support bar 110 may need to be altered to accommodate the spring 190 and the pin 200. It should be understood that various features of the reconfigurable cup holder assembly 12A such as the support bar 110, the top section 144 of the housing 142, and the housed piece 148, are not illustrated in FIGS. 19A-19E for the sake of simplicity.

Figure 19A:
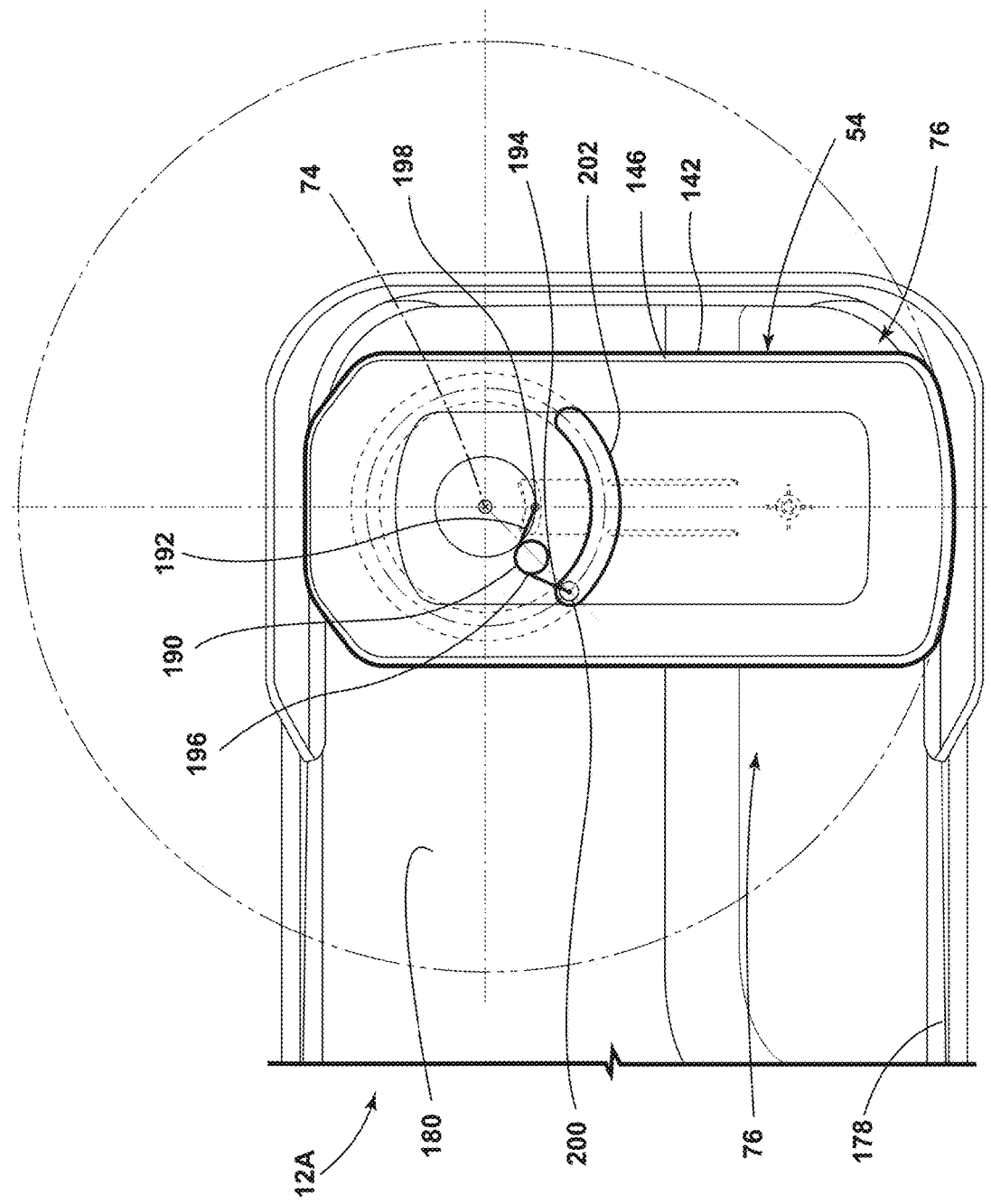
FIGS. 19A-19E are overhead views of a sequence of an alternative reconfigurable cup holder assembly that uses a spring to bias the cup holder portion in either the first position or the second position, whichever is closest to the present position of the cup holder assembly.
Figure 19B:
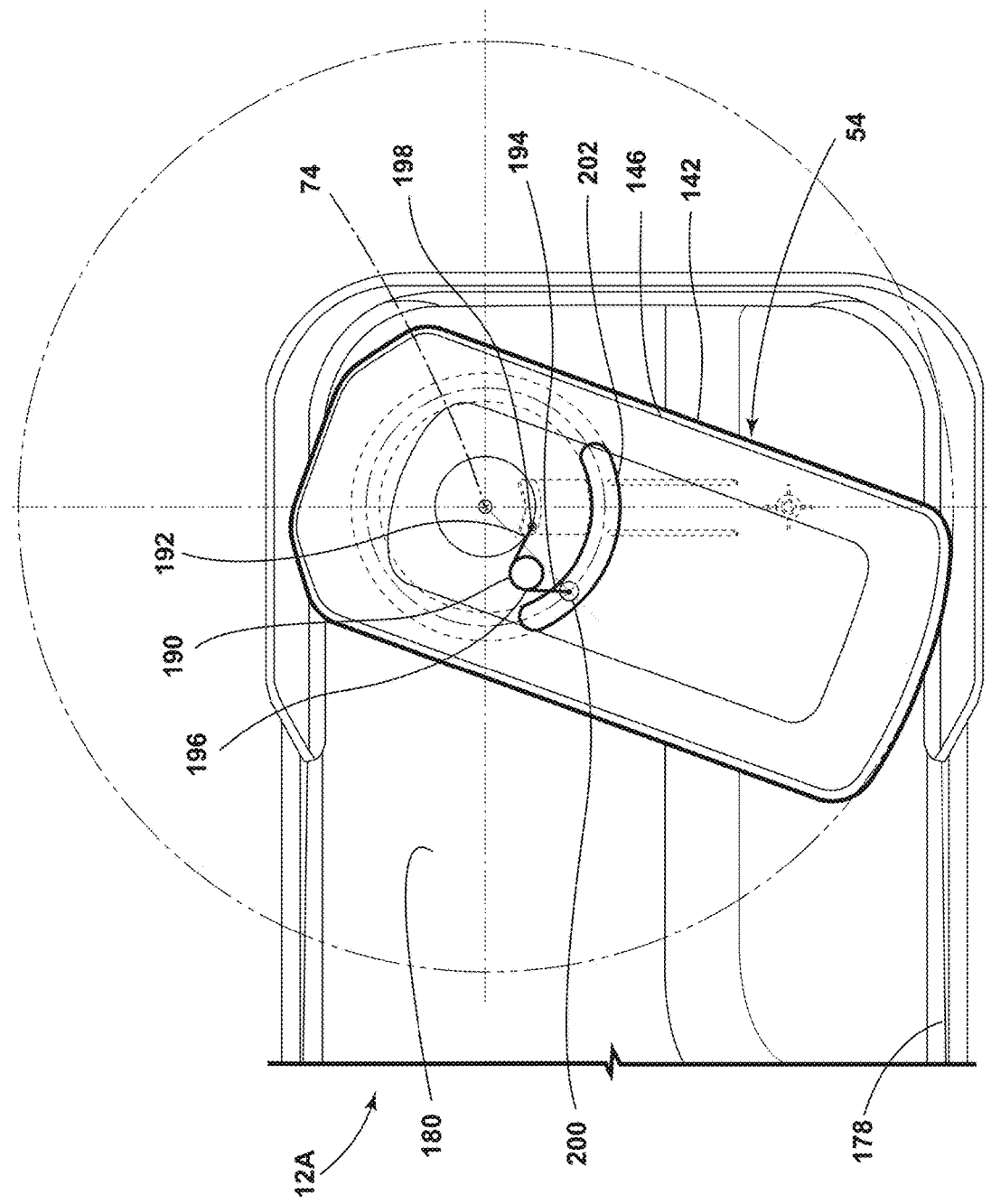
Figure 19C:
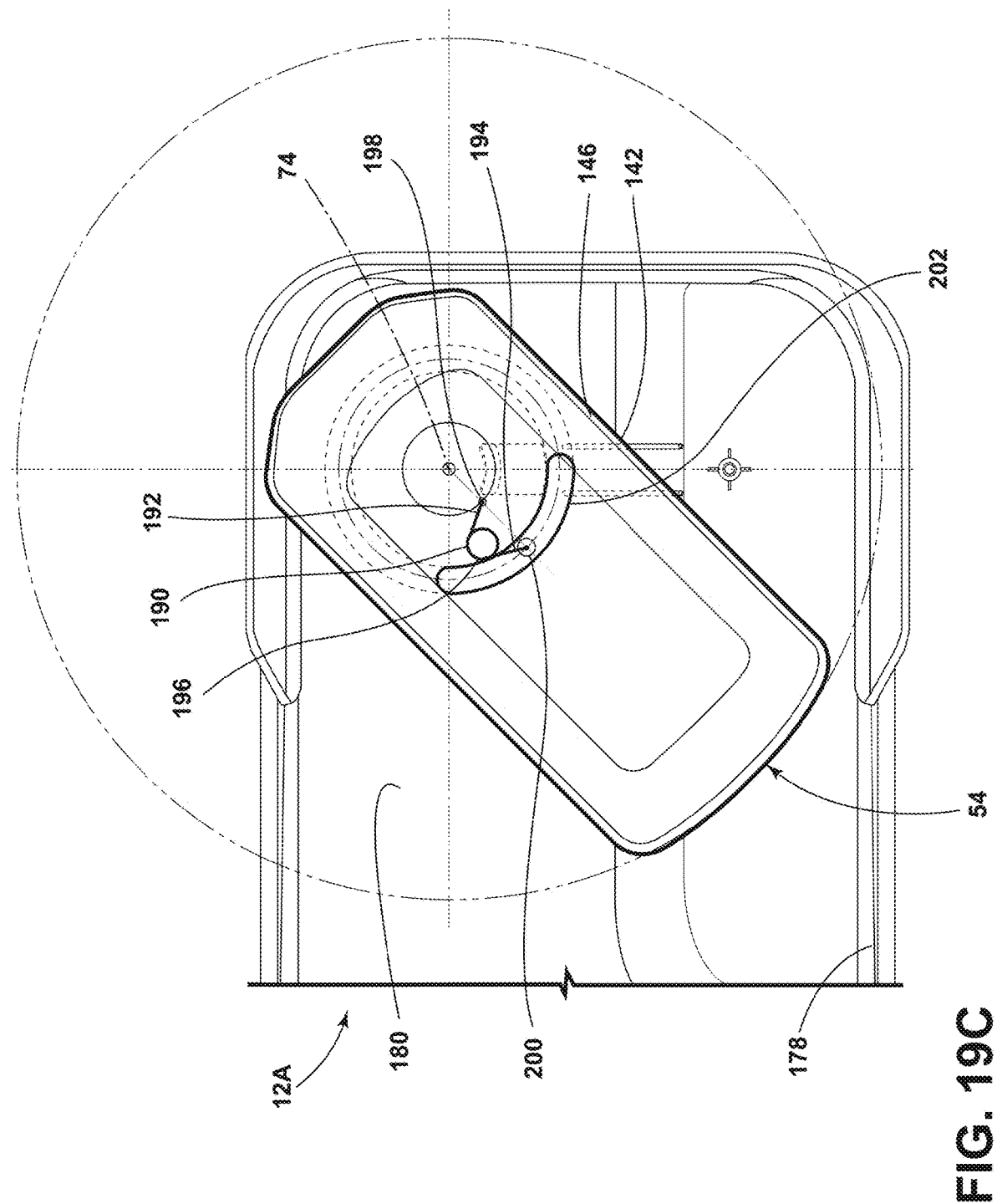
Figure 19D:
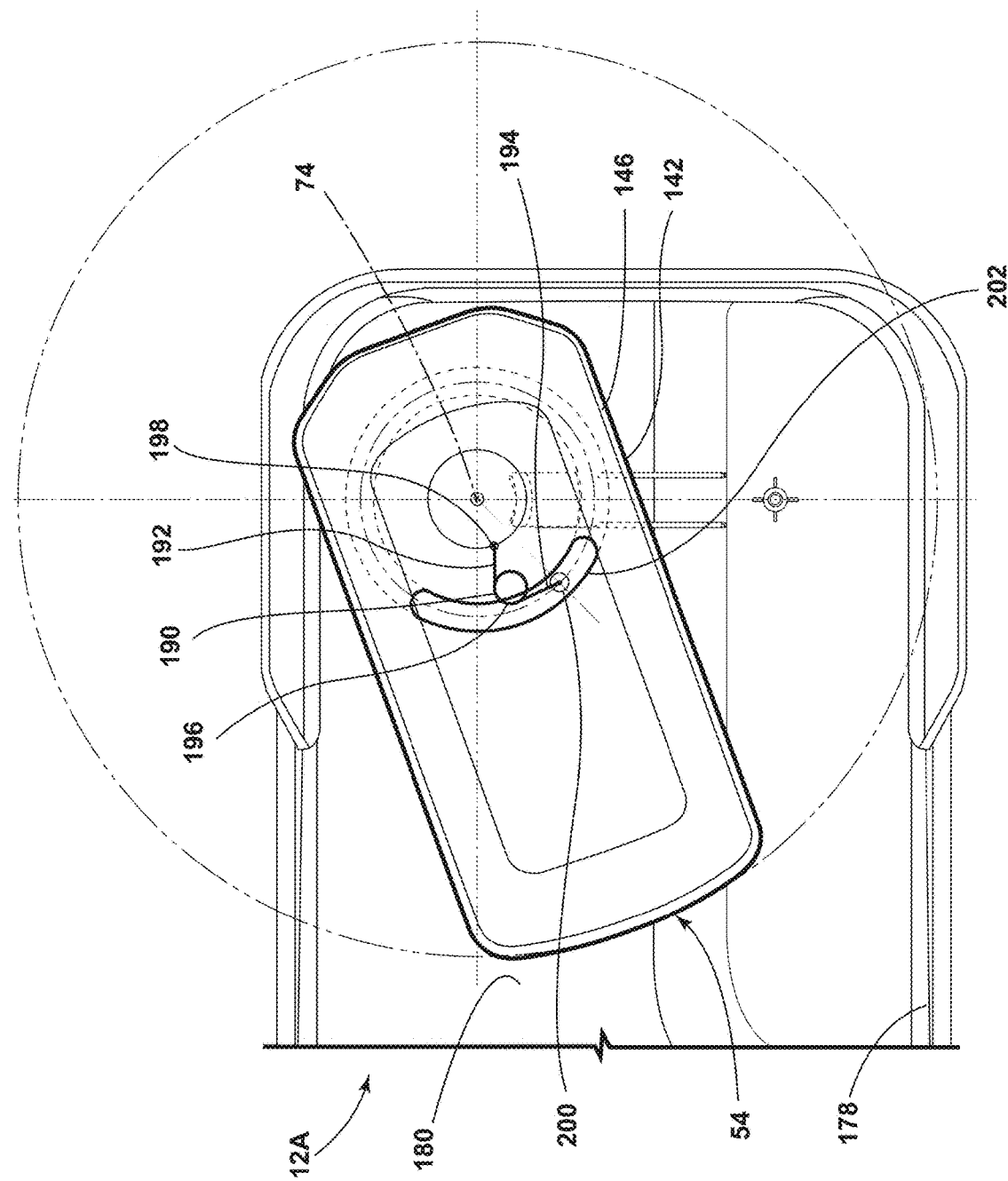
Figure 19E:
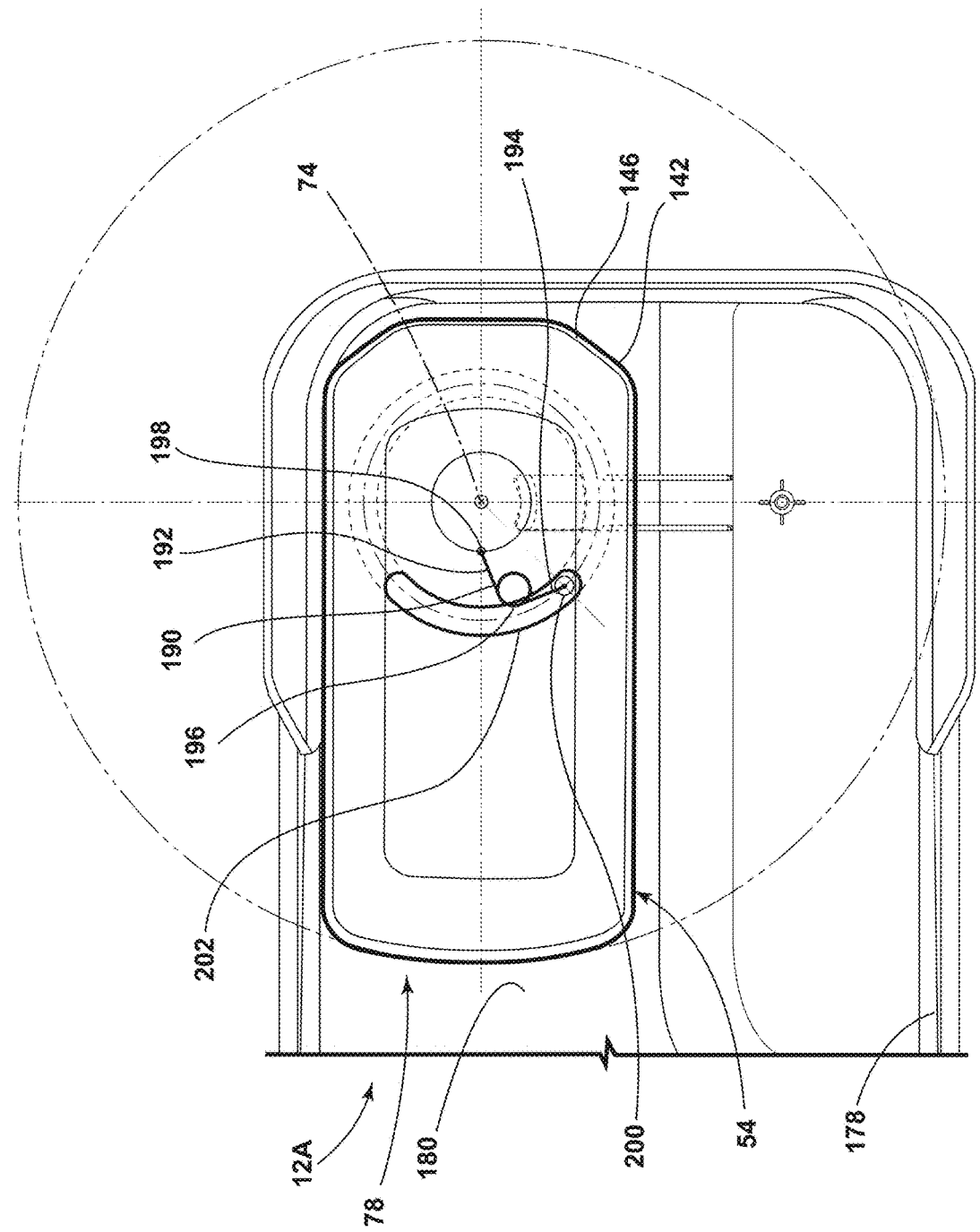

Assuming that the cup holder portion 54 is in the first position 76 as in FIG. 19A, the spring 190 is in its least energized state. Then, as the cup holder portion 54 moves away from the first position 76 (FIG. 19B), the first end 192 and the second end 194 of the spring 190 come closer to together and the wound portion 196 energizes. If a torque moving the cup holder portion 54 away from the first position 76 ceases, the spring 190, now energized, forces the cup holder portion 54 to rotate back to the first position 76 (FIG. 19A). However, if the torque continues, the cup holder portion 54 continues to rotate away from first position 76 (FIG. 19B) to half-way between the first position 76 and the second position 78, as illustrated in FIG. 19C. Here, the first end 192 and the second end 194 of the spring 190 are the least separated and the wound portion 196 most energized. If the torque moving the cup holder portion 54 overcomes the resistance of the spring 190, the cup holder portion 54 moves past the half-way position towards the second position 78, as illustrated in FIG. 19D. Now the spring 190 is still somewhat energized. If the torque ceases, the wound portion 196 releases energy and spreads the first end 192 and the second end 194 apart, which results in the cup holder portion 54 moving to the second position 78, as illustrated in FIG. 19E. In short, the spring 190 biases the cup holder portion 54 to whichever of the first position 76 and the second position 78 is the closest position to the current position of the cup holder portion 54. A torque must overcome the bias in order to move the cup holder portion 54 from the first position 76 to the second position 78, and vice-versa.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A reconfigurable cup holder assembly for a vehicle comprising:
    a base structure; and
    a cup holder portion pivotably coupled to the base structure about a pivot axis, the cup holder portion comprising a first cup holder and a second cup holder, each of the first cup holder and the second cup holder defining a space configured to hold a container for liquid, and the cup holder portion is pivotable about the pivot axis to, from, and between a first position relative to the base structure and a second position relative to the base structure;
    wherein, the space of the first cup holder is at least partially defined by a side wall of the first cup holder terminating at a top that defines an opening; and
    wherein, the pivot axis extends through the opening into the space that the first cup holder defines without intersecting with the side wall of the first cup holder.

2. The reconfigurable cup holder assembly of claim 1, wherein
    the second cup holder pivots greater than or equal to 75 degrees about the pivot axis when the cup holder portion moves from the first position to the second position.

3. The reconfigurable cup holder assembly of claim 1, wherein
    the base structure comprises a pivot bracket disposed at least partially under the first cup holder of the cup holder portion, the pivot bracket comprising a receiver through which the pivot axis extends, the receiver bounded by a radial surface having a radius from the pivot axis and a height parallel with the pivot axis; and
    the reconfigurable cup holder assembly further comprises a support bar comprising (i) a bracket attachment section comprising a cylindrical portion that is disposed and rotatable within the receiver of the pivot bracket, the pivot axis extending through the cylindrical portion, and (ii) a bar section extending outward from the bracket attachment section and the pivot axis, the bar section terminating under the second cup holder.

4. The reconfigurable cup holder assembly of claim 3, wherein
    the bracket attachment section of the support bar further comprises snap-fit elements, and the snap-fit elements cooperate with slots into or through the radial surface of the receiver of the pivot bracket to resist withdrawal of the bracket attachment section of the support bar from the receiver of the pivot bracket.

5. The reconfigurable cup holder assembly of claim 3, wherein
    the cup holder portion further comprises a housing that at least partially houses the side wall and a bottom surface of the first cup holder and a side wall and a bottom surface of the second cup holder,
    the housing comprises a bottom wall extending under the bottom surface of the first cup holder and the bottom surface of the second cup holder, and
    the bottom wall of the housing is attached to the support bar.

6. The reconfigurable cup holder assembly of claim 5, wherein
    the housing of the cup holder portion is attached to the support bar under the first cup holder and under the second cup holder.

7. The reconfigurable cup holder assembly of claim 5, wherein
    the bar section of the support bar is disposed between the bottom surface of the second cup holder and the bottom wall of the housing of the cup holder portion.

8. The reconfigurable cup holder assembly of 1, wherein
    the base structure comprises a storage bin at least partially surrounding the cup holder portion, the storage bin comprising (i) a bottom wall that is disposed under both the first cup holder and the second cup holder when the cup holder portion is in the first position and when the cup holder is in the second position, and (ii) a side wall that extends upwardly from the bottom wall, the side wall comprising portions that face each other and between which the cup holder portion is disposed.

9. The reconfigurable cup holder assembly of claim 8, wherein
    the storage bin further comprises an aperture through the bottom wall, through which the pivot axis extends.

10. The reconfigurable cup holder assembly of claim 9, wherein
    the base structure further comprises a pivot bracket disposed at least partially under the first cup holder of the cup holder portion and the bottom wall of the storage bin, the pivot bracket comprising a receiver through which the pivot axis extends; and
    the reconfigurable cup holder assembly further comprises a support, bar comprising (i) a bracket attachment section comprising a cylindrical portion that is disposed through the aperture through the bottom wall of the storage bin and into the receiver of the pivot bracket, the cylindrical portion of the bracket attachment section being rotatable within the receiver of the pivot bracket, and the pivot axis extending through the cylindrical portion of the bracket attachment section, and (ii) a bar section extending outward from the bracket attachment section and from the pivot axis, the bar section terminating under the second cup holder and above the bottom wall of the storage bin.

11. The reconfigurable cup holder assembly of claim 8, wherein
    the bottom wall of the storage bin comprises a flat portion and a valley portion;

when the cup holder portion is in the first position, the first cup holder is disposed over the flat portion and the second cup holder is disposed over the valley portion; and when the cup holder portion is in the second position, the first cup holder is disposed over the flat portion and the second cup holder is disposed over the flat portion thus allowing greater access to the valley portion from an environment external to the reconfigurable cup holder assembly than when the cup holder portion is in the first position.

12. The reconfigurable cup holder assembly of claim 1 disposed at a center console of a vehicle.

13. A vehicle comprising:
a reconfigurable cup holder assembly comprising:
 a base structure; and
 a cup holder portion pivotably coupled to the base structure about a pivot axis, the cup holder portion comprising a first cup holder and a second cup holder, each of the first cup holder and the second cup holder defining a space configured to hold a container for liquid, and the cup holder portion is pivotable about the pivot axis to, from, and between a first position relative to the base structure and a second position relative to the base structure:
wherein, the space of the first cup holder is at least partially defined by a side wall of the first cup holder terminating at a top defines an opening; and
wherein, the pivot axis extends through the opening into the space that the first cup holder defines, without intersecting with the side wall of the first cup holder.

14. The vehicle of claim 13,
the base structure comprises a pivot bracket disposed at least partially under the first cup holder of the cup holder portion, the pivot bracket comprising a receiver through which the pivot axis extends; and
the reconfigurable cup holder assembly further comprises a support bar comprising (i) a bracket attachment section comprising a cylindrical portion that is disposed and rotatable within the receiver of the pivot bracket, the pivot axis extending through the cylindrical portion, and (ii) a bar section extending outward from the bracket attachment section and the pivot axis, the bar section terminating under the second cup holder.

15. The vehicle of claim 13 further comprising:
a row of seating comprising a first seating assembly and a second seating assembly;

wherein, the reconfigurable cup holder assembly is disposed inboard relative to the first seating assembly and inboard relative to the second seating assembly.

16. The vehicle of claim 13 further comprising:
a row of seating comprising a common seat portion that is configured to support, more than one passenger of the vehicle;
wherein, the reconfigurable cup holder assembly further comprises (i) a stowed position where the cup holder portion is inaccessible from the row of seating, and (ii) a usable position where the reconfigurable cup holder assembly is disposed over the common seat portion and the cup holder portion is accessible from the row of seating.

17. The vehicle of claim 13, wherein
the pivot axis about which the cup holder portion of the reconfigurable cup holder assembly pivots is either vertical or varies from vertical by an angle of less than or equal to 10 degrees.

18. The vehicle of claim 13, wherein
the vehicle is configured to move in a forward direction; and
a plane extending vertically through both the first cup holder and the second cup holder is disposed more orthogonally to the forward direction while in the first position than while in the second position.

19. The vehicle of claim 18, wherein
the plane extending vertically through both the first cup holder and the second cup holder moves throughout a range greater than or equal to 75 degrees while the cup holder portion moves from the first position to the second position.

20. A vehicle comprising:
a cup holder portion comprising a first cup holder and a second cup holder, the cup holder portion pivotable about a pivot axis that extends through the first cup holder; the second cup holder pivotable about the pivot axis throughout an angle of greater than or equal to 75 degrees,
wherein the pivot axis is either vertical or varies from vertical by an angle of less than or equal to 10 degrees; and
wherein each of the first cup holder and the second cup holder defines a space configured to hold a container for liquid.

* * * * *

UNITED STATES PATENT AND TRADEMARK OFFICE
CERTIFICATE OF CORRECTION

PATENT NO. : 11,654,813 B2
APPLICATION NO. : 17/246230
DATED : May 23, 2023
INVENTOR(S) : Gregory Paul Thomas et al.

It is certified that error appears in the above-identified patent and that said Letters Patent is hereby corrected as shown below:

In the Claims

Column 14:
Claim 10, Line 52;
After "support" delete -- , --

Column 15:
Claim 13, Line 25;
":" should be -- ; --
Claim 13, Line 28;
After "top" insert -- that --
Claim 13, Line 30;
After "defines" delete -- , --

Column 16:
Claim 16, Line 6;
After "support" delete -- , --
Claim 20, Line 37;
";" should be -- , --

Signed and Sealed this
Seventh Day of November, 2023

Katherine Kelly Vidal
*Director of the United States Patent and Trademark Office*